(12) United States Patent
Miyake et al.

(10) Patent No.: US 12,526,304 B2
(45) Date of Patent: Jan. 13, 2026

(54) ADAPTIVE PROTECTION MECHANISMS LOOP

(71) Applicant: Microsoft Technology Licensing, LLC, Redmond, WA (US)

(72) Inventors: Erin K. Miyake, Seattle, WA (US); Bhavanesh Rengarajan, Sammamish, WA (US); Tanay Baldua, Mumbai (IN); Talhah Munawar Mir, Bothell, WA (US); Rudra Mitra, Yarrow Point, WA (US); Apsara Karen Selvanayagam, London (GB); John Alphonse, Redmond, WA (US); Ethan Max Stakoff, Seattle, WA (US); Jiajun Zhang, Bellevue, WA (US); Sizhe Zheng, West Lafayette, IN (US); Ruben Eugenio Cantu Vota, Seattle, WA (US); Kun Yao, Bellevue, WA (US); Xin Liu, Mercer Island, WA (US); Maithili Dandige, Kirkland, WA (US); Hubert Dushime, Vancouver (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 242 days.

(21) Appl. No.: 18/112,090

(22) Filed: Feb. 21, 2023

(65) Prior Publication Data
US 2024/0259416 A1 Aug. 1, 2024

(51) Int. Cl.
*H04L 9/40* (2022.01)
(52) U.S. Cl.
CPC ........ *H04L 63/1433* (2013.01); *H04L 63/102* (2013.01)

(58) Field of Classification Search
CPC ............. H04L 63/1433; H04L 63/102; G06F 21/554; G06F 21/552
See application file for complete search history.

(56) References Cited

U.S. PATENT DOCUMENTS 9,405,897 B1 * 8/2016 Bailey ................. H04L 9/3271
9,609,011 B2 3/2017 Muddu et al.
(Continued)

FOREIGN PATENT DOCUMENTS

CN 106713288 A * 5/2017
CN 113704772 A 5/2022
(Continued)

OTHER PUBLICATIONS

International Search Report and Written Opinion received for PCT Application No. PCT/US24/10973, May 21, 2024, 13 pages.
(Continued)

*Primary Examiner* — Sarah Su
(74) *Attorney, Agent, or Firm* — Rainier Patents, P.S.

(57) ABSTRACT

Some embodiments operationally connect a risk score with cybersecurity protection mechanisms and user interactions data in a feedback loop. The risk score guides protection activities by the protection mechanisms, thereby prompting or preventing various user interactions. The protection activities and the user interactions are recorded in audit logs, and curated data based on the audit logs is fed to a risk scoring model as input. The risk scoring model then updates the risk score, and the loop repeats as the protection mechanisms alter their protection activities based on the updated risk score, thereby providing adaptive protection. Security tools for insider risk management, data leak prevention, and conditional access are enhanced to provide adaptive protection, by recording protection activities and user interactions for use as risk model input, and by checking regularly for (Continued)

EXAMPLE ADAPTIVE PROTECTION LOOP 1100 risk score updates and modifying their protection activities accordingly.

20 Claims, 6 Drawing Sheets

(56) References Cited

U.S. PATENT DOCUMENTS

| | | | | |
|---|---|---|---|---|
| 9,798,883 | B1* | 10/2017 | Gil | H04L 63/1433 |
| 9,882,918 | B1* | 1/2018 | Ford | H04L 63/14 |
| 10,284,588 | B2* | 5/2019 | Solow | H04L 63/1433 |
| 11,265,329 | B2 | 3/2022 | Koottayi et al. | |
| 2013/0097701 | A1* | 4/2013 | Moyle | H04L 63/1416 726/22 |
| 2018/0103065 | A1* | 4/2018 | Graham | H04L 63/08 |
| 2018/0288063 | A1* | 10/2018 | Koottayi | G06F 21/50 |
| 2019/0034625 | A1* | 1/2019 | Ford | H04L 67/146 |
| 2019/0044963 | A1 | 2/2019 | Rajasekharan et al. | |
| 2019/0260786 | A1* | 8/2019 | Dunn | H04L 43/045 |
| 2020/0274894 | A1 | 8/2020 | Argoeti | |
| 2020/0372154 | A1* | 11/2020 | Bacher | G06F 16/1834 |
| 2021/0006542 | A1* | 1/2021 | Myneni | H04L 63/20 |
| 2021/0226983 | A1* | 7/2021 | Cunningham | H04L 63/102 |
| 2022/0086182 | A1* | 3/2022 | Maggioli | H04L 63/1433 |
| 2022/0191235 | A1* | 6/2022 | Ni | G06F 16/245 |
| 2022/0377093 | A1* | 11/2022 | Crabtree | H04L 43/045 |
| 2023/0199014 | A1* | 6/2023 | Swift | G06N 3/08 726/25 |
| 2023/0344842 | A1* | 10/2023 | Akhtar | H04L 63/1425 |
| 2024/0121262 | A1* | 4/2024 | Gill | H04L 63/1483 |

FOREIGN PATENT DOCUMENTS

| | | | | |
|---|---|---|---|---|
| EP | 3374870 | B1* | 3/2021 | G06F 11/00 |
| WO | WO-2014138115 | A1* | 9/2014 | G06F 21/6254 |
| WO | WO-2016050990 | A1* | 4/2016 | H04W 12/06 |
| WO | WO-2023154158 | A1* | 8/2023 | G06F 21/34 |
| WO | WO-2023229782 | A1* | 11/2023 | G06F 21/554 |

OTHER PUBLICATIONS

"Custom Policy Wizard—Severity and Action", Retrieved From: https://www.websense.com/content/support/library/data/v86/help/Severity.aspx, Retrieved on: Nov. 1, 2022, 3 Pages.
"Data Loss Prevention", Retrieved From: https://web.archive.org/web/20221116212510/https://www.fortra.com/solutions/data-security/data-protection/data-loss-prevention, Nov. 16, 2022, 5 Pages.
"Detect Web3 Threats and Anomalies in Real-Time with Machine Learning", Retrieved From: https://forta.org/, Retrieved on: Nov. 1, 2022, 6 Pages.
"DTEX InTERCEPT for Behavioral DLP", Retrieved From: https://www.dtexsystems.com/wp-content/uploads/2021/11/DTEX_Behavioral-DLP_Solutions-Brief_E.pdf, Nov. 1, 2022, 2 Pages.
"Fortra's Digital Guardian", Retrieved From: https://web.archive.org/web/20221102125725/https://www.fortra.com/ product-lines/digital-guardian, Nov. 2, 2022, 3 Pages.
"Insider Risk", Retrieved From: https://www.netskope.com/solutions/insider-risk, Nov. 11, 2022, 5 Pages.
"Insider Risk Self-Assessment Tool", Retrieved From: https://www.cisa.gov/insider-risk-self-assessment-tool, Retrieved on: Nov. 1, 2022, 2 Pages.
"Insider Risks In the Work-From-Home World", Retrieved From: https://threatpost.com/insider-risks-work-from- ome/166874/, Jun. 15, 2021, 7 Pages.
"Insider Threat Management", Retrieved From: https://www.dtexsystems.com/solutions/insider-threat-management/, Retrieved on: Nov. 1, 2022, 10 Pages.
"MITRE", Retrieved From: https://insiderthreat.mitre.org/, Jun. 5, 2022, 3 Pages.
"Risk-Adaptive Protection", Retrieved From: https://www.forcepoint.com/product/risk-adaptive-protection, Retrieved on: Nov. 1, 2022, 13 Pages.
"The Connection Between Insider Threats and Data Loss Prevention", Retrieved From: https://www.proofpoint.com/us/blog/insider-threat-management/connection-between-insider-threats-and-data-loss-prevention, Jun. 26, 2018, 5 Pages.
Bilich, Ted, "Feedback Loops: A Risk Management Essential", Retrieved From: https://riskalts.com/feedback-loops-a-risk-management-essential/, Retrieved on: Nov. 1, 2022, 5 Pages.
Elmrabit, et al., "Insider Threat Risk Prediction based on Bayesian Network", In Journal of Computers & Security, vol. 96, Sep. 1, 2020, 23 Pages.
Mazzoli, et al., "Get started with insider risk management settings", Retrieved From: https://learn.microsoft.com/en-us/microsoft-365/compliance/insider-risk-management-settings?view=o365-worldwide, Feb. 4, 2023, 46 Pages.
Mazzoli, et al., "Insider Risk Management", Retrieved From: https://learn.microsoft.com/en-us/microsoft-365/ compliance/insider-risk-management-solution-overview?view=o365-worldwide, Oct. 25, 2022, 2 Pages.
Pereira, Daniel, "Is Your Insider Threat Risk Management Program Ripe for Innovation? Part 1", Retrieved From: https://www.oodaloop.com/archive/2022/04/28/is-your-insider-threat-risk-management-program-ripe-for-innovation-part-1/, Apr. 28, 2022, 6 Pages.
Sticha, et al., "Using dynamic models to support inferences of insider threat risk", In Journal of Computational and Mathematical Organization Theory, Jan. 18, 2016, pp. 350-381.
Warner, et al., "Azure Policy pattern: logical operators", Retrieved From: https://learn.microsoft.com/en-us/azure/governance/policy/samples/pattern-logical-operators, Aug. 18, 2021, 6 Pages.
Wojtasiak, Mark, "Insider Risk Management Framework: A New Approach to Data Protection", Nov. 1, 2022, 3 Pages.
Wojtasiak, Mark, "Insider Risk: The Data Protection Problem That Needs an Integrated Approach", Retrieved From: https://www.code42.com/blog/insider-risk-the-data-protection-problem-that-needs-an-integrated-approach/, Nov. 23, 2020, 6 Pages.
Wojtasiak, Mark, "The Incydr Scoop: The Dynamic (aka Messy) Nature of Insider Risk", Retrieved From: https:// www.code42.com/blog/the-incydr-scoop-the-dynamic-aka-messy-nature-of-insider-risk/, Mar. 18, 2021, 8 Pages.
"Forcepoint Dynamic Data Protection Getting Started Guide", retrieved from << http://www.websense.com/content/support/library/ddp/v10/getting_started/getting_started_guide.pdf >>, Aug. 23, 2019, 12 pages.
"Risk-Adaptive Protection Overview", retrieved from << https://forcepoint.drift.click/RAPDatasheet >>, no later than Dec. 31, 2022, 18 pages.
"User and Entity Behavior Analytics (UEBA)", retrieved from << https://www.imperva.com/learn/data-security/ueba-user-and-entity-behavior-analytics/ >>, no later than Dec. 31, 2022, 5 pages.
International Preliminary Report on Patentability (Chapter I) received for PCT Application No. PCT/US2024/010973, mailed on Aug. 7, 2025, 07 pages.

* cited by examiner

SOME PROTECTION MECHANISMS 124 AND RELATED ITEMS

- DATA CONFIDENTIALITY 420 PROTECTION MECHANISM 402
- DATA INTEGRITY 422 PROTECTION MECHANISM 404
- DATA RETENTION 424 GOVERNANCE 426 PROTECTION MECHANISM 406
- DEVICE 101 PROTECTION MECHANISM 408
- NETWORK ACCESS 428 PROTECTION MECHANISM 410
- DIGITAL IDENTITY 430 PROTECTION MECHANISM 412
- APPLICATION 432 PROTECTION MECHANISM 414
- PHYSICAL FACILITY 434 PROTECTION MECHANISM 416
- COMMUNICATIONS 436 PROTECTION MECHANISM 418

Fig. 4

SOME SECURITY TOOLS 318 AND RELATED ITEMS

- INSIDER RISK 508 MANAGEMENT TOOL 502
- POLICY 522
- INSIGHT 514
- DATA LEAK 510 PREVENTION TOOL 504
- OBJECT 516 STORE 518
- CONDITIONAL ACCESS 512 MANAGEMENT TOOL 506
- PEER GROUP 520

Fig. 5

SOME EVENTS 130 AND OTHER PROTECTION-RELATED ITEMS

- SYSTEM-GENERATED EVENT 602
- MECHANISM 124-GENERATED EVENT 604
- CLASSIFICATION 606
- METADATA 608
- WARNING 632
- THRESHOLD 610
- HUMAN RESOURCES 612 DATA 614
- RISKY 616 BEHAVIOR 618 DATA 620
- PLATFORM 622
- WORKLOAD 624
- SENTIMENT 626 ANALYSIS 628 DATA 630

Fig. 6

EXAMPLE ADAPTIVE PROTECTION LOOP 1100

EXAMPLE USER RISK PROFILE UPDATE PROCESS 1300

ADAPTIVE PROTECTION MECHANISMS LOOP

RELATED APPLICATIONS

The present application claims priority to, and incorporates by reference the entirety of, provisional patent application no. 202341005517 filed 27 Jan. 2023 with the Indian Patent Office.

BACKGROUND

Attacks on a computing system may take many different forms, including some forms which are difficult to predict, and forms which may vary from one situation to another. Accordingly, one of the guiding principles of cybersecurity is "defense in depth". In practice, defense in depth is often pursed by forcing attackers to encounter multiple different kinds of security mechanisms at multiple different locations around or within the computing system. No single security mechanism is able to detect every kind of cyberattack, able to determine the scope of an attack or vulnerability, or able to end every detected cyberattack. But sometimes combining and layering a sufficient number and variety of defenses and investigative tools will prevent an attack, deter an attacker, or at least help limit the scope of harm from an attack or a vulnerability.

To implement defense in depth, cybersecurity professionals consider the different kinds of attacks that could be made against a computing system, and the different vulnerabilities the system may include. They select defenses based on criteria such as: which attacks are most likely to occur, which attacks are most likely to succeed, which attacks are most harmful if successful, which defenses are in place, which defenses could be put in place, and the costs and procedural changes and training involved in putting a particular defense in place or removing a particular vulnerability to attack. They investigate the scope of an attack, and try to detect vulnerabilities before they are exploited in an attack. Some defenses or investigations might not be feasible or cost-effective for the particular computing system. However, improvements in cybersecurity remain possible, and worth pursuing.

SUMMARY

Some embodiments described herein address technical challenges of computer technology, and more particularly technical challenges posed by cybersecurity technology which is over-protective in some circumstances, under-protective in other circumstances, inefficient in the use of computational resources, unduly burdensome on users, and not easily scalable. Alternatives described herein efficiently tailor protection levels to recent circumstances, in a scalable manner. The tailoring is also performed proactively and automatically, without requiring constant manual intervention from admins or other people.

Some embodiments described herein monitor a user's behavior (interactions with a computing system) and perform cybersecurity protection activities according the user's behavior in a protected computing environment and a risk score of the user. Some embodiments record the user's behavior and the protection activities as data. Then they modify the user's risk score based on the user's behavior and the protection activities (strictly speaking, based on the data), in a repeating loop which guides future protection activities, thus providing adaptive protection.

Some embodiments described herein read a record of a user's behavior (interactions with a computing system) and of protection activities that are performed by protection mechanisms according to the user's behavior and according to a risk score of the user. They submit the user behavior data and the protection activity data to a risk scoring model, such as a machine learning model or a statistical model. They receive an updated risk score of the user from the risk scoring model, and the loop repeats as the protection mechanisms operate according to the updated risk score of the user. This looping provides an adaptive protection functionality whereby the user behavior and protection activity influence the risk score, which in turn influences protection activity (and hence user behavior), and so on as the loop repeats.

Other technical activities and characteristics pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims as properly understood, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

FIG. 4 is a block diagram illustrating some security protection mechanisms and related items;

FIG. 5 is a block diagram illustrating some security tools and related items;

FIG. 6 is a block diagram illustrating some events and related items;

DETAILED DESCRIPTION

Overview

Figure 1:
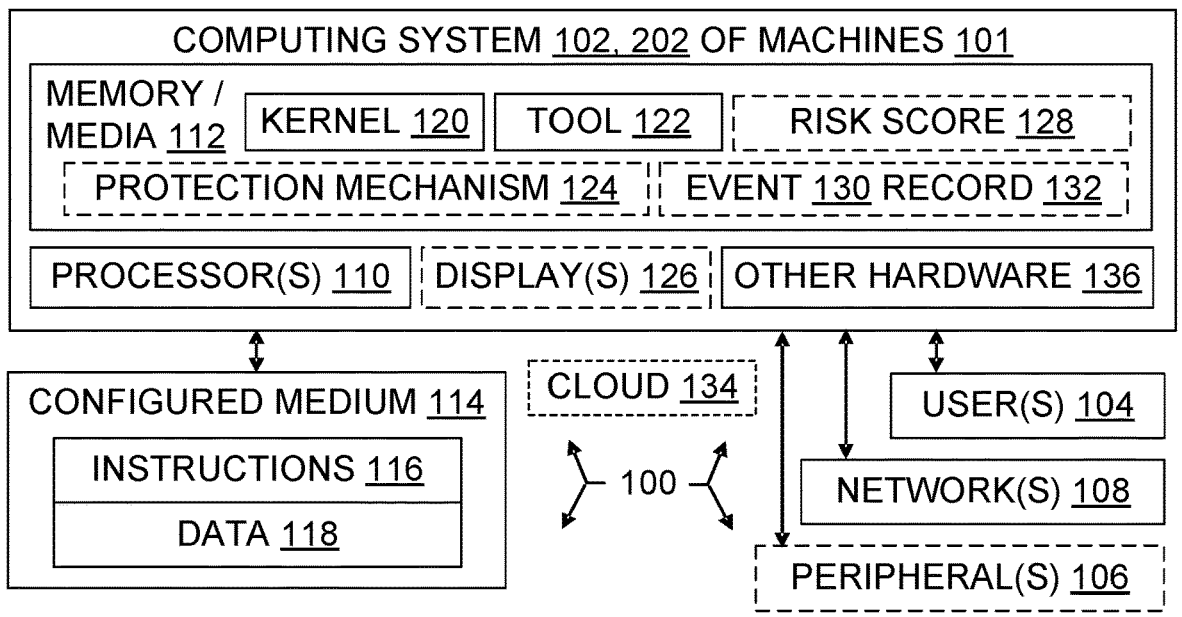
FIG. 1 is a diagram illustrating aspects of computer systems and also illustrating configured storage media, including some aspects generally suitable for systems which provide adaptive protection functionality.

Innovations may expand beyond their origins, but understanding an innovation's origins can help one more fully appreciate the innovation. In the present case, some teachings described herein were motivated by technical challenges faced by Microsoft innovators who were working to improve computer technology which secures data, software, and other resources in a computing environment.

The innovators observed that many protection controls are based on static or conditional inputs. For example, organizations can apply protection controls based on attributes of an account, activity, or file. These controls are generally effective in dealing with expected specific transactions. However, challenges arise when an organization attempts to apply security controls in a response to (or in a prediction of) human behavior that is dynamic, multi-faceted, and complex, e.g., insider risk behavior. Reliance on controls which are guided by static or conditional inputs can lead to overwhelmed and fatigued security teams, as well as frustrated information workers who experience many limitations that disrupt their productivity.

The innovators hypothesized that more efficient and more effective protection in insider risk scenarios would be provided by security technology which has several technical characteristics. Such technology would also be beneficial in other scenarios that involve complex human interactions with a computing environment.

Such technology would be adaptive and dynamic, e.g., as a risk from a particular human user's behavior gets more severe, the controls would adaptively get more severe in constraining that person's behavior. Conversely, if the risk posed by that person's behavior decreases due to a pattern of good behavior, then the controls would adaptively loosen up.

Such technology would also be automated and proactive, thus minimizing or even eliminating any need for human efforts to manually alter the control settings when some unexpected context arose during a given timeframe.

Such technology would also be extensible, allowing an organization to scale not only across users or facilities, but also across a breadth of control planes which are relied on to secure data, devices, networks, identities, and applications.

Such technology would also be responsive to user interaction with a protected system, in a feedback loop. The technology would learn continually from how a user interacts with security policy outcomes in the system, and the technology would in turn adjust policy 522 scope automatically according to the current or recent circumstances.

Some embodiments described herein meet these and other technical challenges and provide technical benefits as a result.

For example, in some embodiments a process includes monitoring a user's behavior and performing protection activities according the user's behavior and according to a risk score of the user; recording in at least one record at least a portion of the user's behavior and recording in the at least one record at least a portion of the protection activities; reading the at least one record and modifying the user's risk score based on the at least one record of the user's behavior and based on the at least one record of the protection activities; and providing adaptive protection by repeating the monitoring, recording, reading, and modifying in a loop. This technical process has the benefit of making the protection activities of a given protection mechanism adaptive, automated, and proactive, and thus more effective than security controls which are guided merely by static or conditional inputs. Another benefit is that the adaptive protection loop technology can be extended to multiple protection mechanisms, thereby securing additional computing environment resources such as devices, identities, applications, and network access points.

In some embodiments, an operating system (OS) performs at least one of: collecting on a device local input signals for the risk scoring model, or executing locally on the device the risk scoring model. This OS-embedded risk scoring architecture has the benefit of providing more efficient storage and bandwidth utilization than approaches which deploy agents for data collection, or transport data across a network for ingestion by a centralized risk scoring model, or do both.

Herein "input signal" is computing science terminology which means input data, and is not to be confused with propagated signals in the patentable subject matter sense of the term "signal". It is understood that the input data is produced in many if not all cases as output of a computation, but for the sake of brevity it is referred to herein simply as "input data" rather than the fuller and more accurate description "data which is output by a computational process and is suitable for subsequent use as input to another computational process".

In some embodiments, modifying a risk score includes submitting data to a risk scoring model, and the submitted data includes at least one of: human resources data, or a result of a sentiment analysis of a communication sent by the user. This has the benefit of basing the risk score on relevant data that is not usually captured by protection mechanisms. A protection mechanism installed and configured to control devices, identities, applications, sensitive data, or other resources would not be expected to capture a user's bad performance review or an angry email from the user to a coworker, but that kind of human resource data and sentiment data may be significant evidence of increased insider risk. Some embodiments automatically and proactively factor in such human resource or sentiment risk input signals (or both) when updating the user's risk score. The updated risk score in turn guides the activities of the protection mechanisms.

Some embodiments automatically and proactively detect at least one of the following behavior patterns: the user performs a risky behavior, receives a warning from a control, and stops the risky behavior; or the user performs a risky behavior, receives a warning from a control, and continues the risky behavior or performs another risky behavior, or both. This has the benefit of permitting the embodiment to efficiently and effectively lower or raise the user's risk score, respectively, thereby reducing or avoiding situations in which the security technology over-protects and thus wastes resources and frustrates users, or under-protects and thus puts system resources at unnecessary risk.

These and other benefits will be apparent to one of skill from the teachings provided herein.

Operating Environments

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud 134. An individual machine is a computer system, and a network or other group of cooperating machines is also a computer system. A given computer system 102 may be configured for end-users, e.g., with applications, for administrators, as a server, as a distributed processing node, and/or in other ways.

Human users 104 sometimes interact with a computer system 102 user interface by using displays 126, keyboards 106, and other peripherals 106, via typed text, touch, voice, movement, computer vision, gestures, and/or other forms of I/O. Virtual reality or augmented reality or both functionalities are provided by a system 102 in some embodiments. A screen 126 is a removable peripheral 106 in some embodiments and is an integral part of the system 102 in some embodiments. The user interface 320 supports interaction between an embodiment and one or more human users. In some embodiments, the user interface includes one or more of: a command line interface, a graphical user interface (GUI), natural user interface (NUI), voice command interface, or other user interface (UI) presentations, presented as distinct options or integrated.

System administrators, network administrators, cloud administrators, security analysts and other security personnel, operations personnel, developers, testers, engineers, auditors, and end-users are each a particular type of human user 104. In some embodiments, automated agents, scripts, playback software, devices, and the like running or otherwise serving on behalf of one or more humans also have user accounts, e.g., service accounts. Sometimes a user account is created or otherwise provisioned as a human user account but in practice is used primarily or solely by one or more services; such an account is a de facto service account. Although a distinction could be made, "service account" and "machine-driven account" are used interchangeably herein with no limitation to any particular vendor.

Storage devices or networking devices or both are considered peripheral equipment in some embodiments and part of a system 102 in other embodiments, depending on their detachability from the processor 110. In some embodiments, other computer systems not shown in FIG. 1 interact in technological ways with the computer system 102 or with another system embodiment using one or more connections to a cloud 134 and/or other network 108 via network interface equipment, for example.

Each computer system 102 includes at least one processor 110. The computer system 102, like other suitable systems, also includes one or more computer-readable storage media 112, also referred to as computer-readable storage devices 112. In some embodiments, tools 122 include security tools or software apps, on mobile devices 102 or workstations 102 or servers 102, compilers and other software development tools, as well as APIs, browsers, or webpages and the corresponding software for protocols such as HTTPS, for example. Files, APIs, endpoints, and other resources may be accessed by an account or set of accounts, user 104 or group of users 104, IP address or group of IP addresses, or other entity. Access attempts may present passwords, digital certificates, tokens or other types of authentication credentials.

Storage media 112 occurs in different physical types. Some examples of storage media 112 are volatile memory, nonvolatile memory, fixed in place media, removable media, magnetic media, optical media, solid-state media, and other types of physical durable storage media (as opposed to merely a propagated signal or mere energy). In particular, in some embodiments a configured storage medium 114 such as a portable (i.e., external) hard drive, CD, DVD, memory stick, or other removable nonvolatile memory medium becomes functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory nor a computer-readable storage device is a signal per se or mere energy under any claim pending or granted in the United States.

The storage device 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as events manifested in the system 102 hardware, product characteristics, inventories, physical measurements, settings, images, readings, volumes, and so forth. Such data is also transformed by backup, restore, commits, aborts, reformatting, and/or other technical operations.

Although an embodiment is described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, some embodiments include one of more of: hardware logic components 110, 136 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. In some embodiments, components are grouped into interacting functional modules based on their inputs, outputs, or their technical effects, for example.

In addition to processors 110 (e.g., CPUs, ALUs, FPUs, TPUs, GPUS, and/or quantum processors), memory/storage media 112, peripherals 106, and displays 126, some operating environments also include other hardware 136, such as batteries, buses, power supplies, wired and wireless network interface cards, for instance. The nouns "screen" and "display" are used interchangeably herein. In some embodiments, a display 126 includes one or more touch screens, screens responsive to input from a pen or tablet, or screens which operate solely for output. In some embodiments, peripherals 106 such as human user I/O devices (screen, keyboard, mouse, tablet, microphone, speaker, motion sensor, etc.) will be present in operable communication with one or more processors 110 and memory 112.

In some embodiments, the system includes multiple computers connected by a wired and/or wireless network 108. Networking interface equipment 136 can provide access to networks 108, using network components such as a packet-switched network interface card, a wireless transceiver, or a telephone network interface, for example, which are present in some computer systems. In some, virtualizations of networking interface equipment and other network components such as switches or routers or firewalls are also present, e.g., in a software-defined network or a sandboxed or other secure cloud computing environment. In some embodiments, one or more computers are partially or fully "air gapped" by reason of being disconnected or only intermittently connected to another networked device or remote cloud. In particular, adaptive protection functionality 208 could be installed on an air gapped network and then be updated periodically or on occasion using removable media 114, or not updated at all. Some embodiments also communicate technical data or technical instructions or both through direct memory access, removable or non-removable volatile or nonvolatile storage media, or other information storage-retrieval and/or transmission approaches.

One of skill will appreciate that the foregoing aspects and other aspects presented herein under "Operating Environments" form part of some embodiments. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but interoperate with items in an operating environment or some embodiments as discussed herein. It does not follow that any items which are not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

In any later application that claims priority to the current application, reference numerals may be added to designate items disclosed in the current application. Such items may include, e.g., software, hardware, steps, processes, systems, functionalities, mechanisms, data structures, resources, machine learning or statistical or other correlation algorithm implementations, or other items in a computing environment, which are disclosed herein but not associated with a particular reference numeral herein. Corresponding drawings may also be added.

More about Systems

Figure 2:
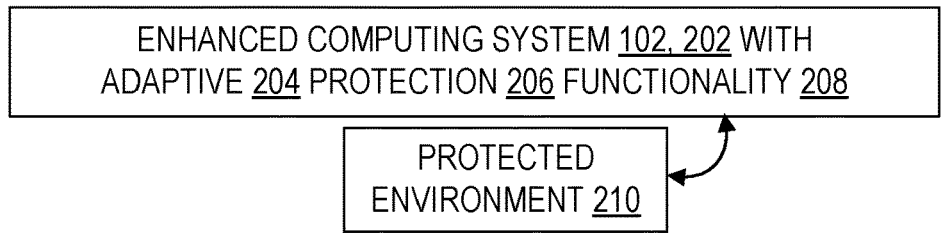
FIG. 2 is a block diagram illustrating a protected environment and an enhanced system which is configured with an adaptive protection functionality.

FIG. 2 illustrates a computing system 102 configured by one or more of the adaptive protection enhancements taught herein, resulting in an enhanced system 202. In some embodiments, this enhanced system 202 includes a single machine, a local network of machines, machines in a particular building, machines used by a particular entity, machines in a particular datacenter, machines in a particular cloud, or another computing environment 100 that is suitably enhanced. Although shown separately in FIG. 2, the protected environment 210 is part of the enhanced system 202 in some embodiments. FIG. 2 items are discussed at various points herein, and additional details regarding them are provided in the discussion of a List of Reference Numerals later in this disclosure document.

Figure 3:
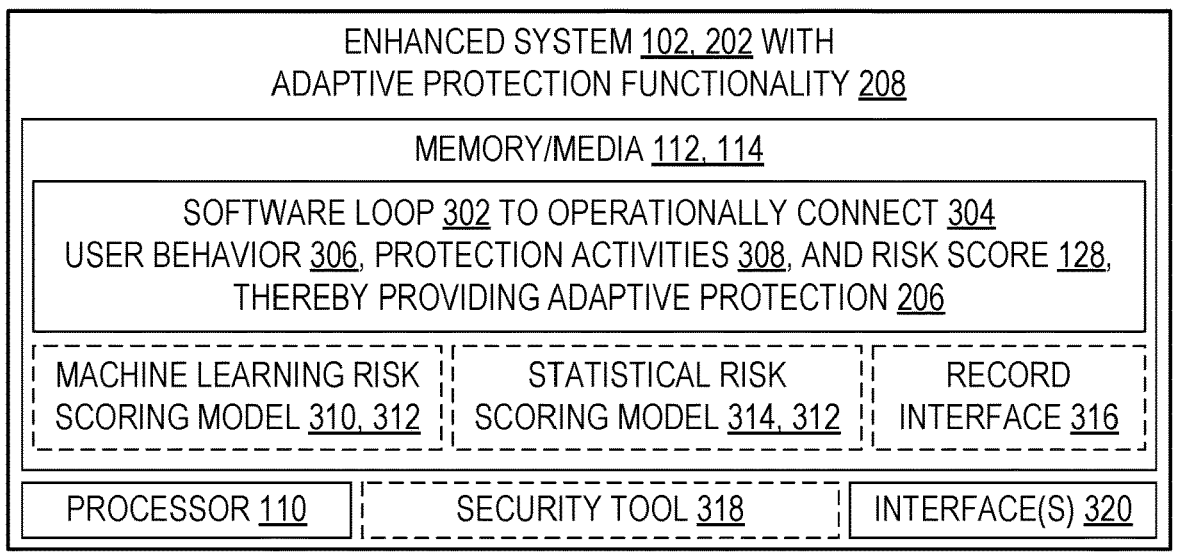
FIG. 3 is a block diagram illustrating aspects of a computing system enhanced with various aspects of adaptive protection functionality.

FIG. 3 shows some aspects of some enhanced systems 202. This is not a comprehensive summary of all aspects of enhanced systems 202 or all aspects of adaptive protection functionality 208. Nor is it a comprehensive summary of all aspects of an environment 100 or system 202 or other context of an enhanced system 202, or a comprehensive summary of all adaptive protection mechanisms 208 for potential use in or with a system 102. FIG. 3 items are discussed at various points herein, and additional details regarding them are provided in the discussion of a List of Reference Numerals later in this disclosure document.

FIG. 4 shows some protection mechanisms 124 (a.k.a. control planes 124 or controls 124) and related items. This is not a comprehensive summary of all resource protection aspects of enhanced systems 202 or all aspects of resource protection functionality 208. FIG. 4 items are discussed at various points herein, and additional details regarding them are provided in the discussion of a List of Reference Numerals later in this disclosure document.

FIG. 5 shows some security tools 318 and related items. This is not a comprehensive summary of all security tools in enhanced systems 202. FIG. 5 items are discussed at various points herein, and additional details regarding them are provided in the discussion of a List of Reference Numerals later in this disclosure document.

FIG. 6 shows some events 130 and related items. Alerts, logins, logouts, logged process states, logged peripheral states, and many other conditions or occurrences, which often vary between systems, are examples of events 130. FIG. 6 is not a comprehensive summary of all events in enhanced systems 202. FIG. 6 items are discussed at various points herein, and additional details regarding them are provided in the discussion of a List of Reference Numerals later in this disclosure document.

Figure 7:
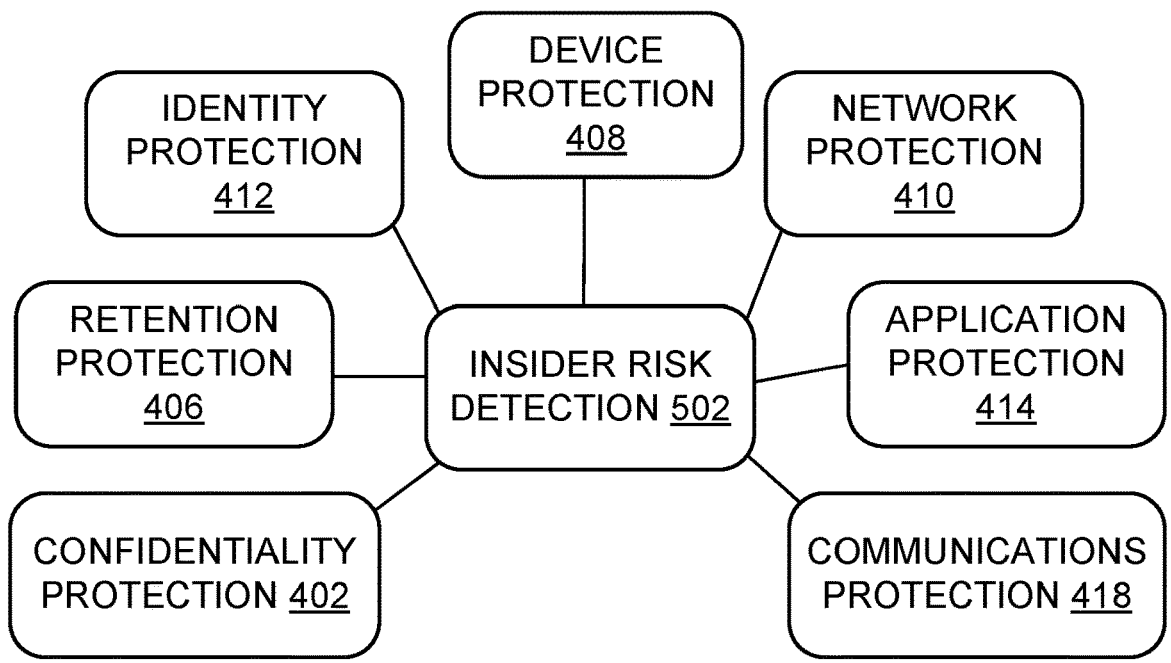
FIG. 7 is a diagram illustrating data flow between an insider risk management security tool and some security protection mechanisms.

The other figures are also relevant to enhanced systems 202. In particular, FIGS. 8 through 13 illustrate processes of system 202 operation, and FIG. 7 illustrates an architecture for insider risk management adaptive protection functionality 208 of an enhanced system 202.

In some embodiments, the enhanced system 202 is networked through an interface 320. In some, an interface 320 includes hardware such as network interface cards, software such as network stacks, APIs, or sockets, combination items such as network connections, or a combination thereof.

Some embodiments include an adaptive protection computing system 202 which includes: a digital memory 112 and a processor set 110 including at least one processor, the processor set in operable communication with the digital memory. The system 202 also includes a record interface 316 to a record 132 created by a protection mechanism 124 or create by multiple protection mechanisms 124 which monitor(s) 1202 a user's behavior 306 and perform(s) 1204 protection activities 308 according the user's behavior and according to a risk score 128 of the user, the protection mechanism(s) also recording 132, 910, 916 the user's behavior in the record and recording 132, 910, 916 the protection activities in the record; a risk scoring model 312 which upon execution by the processor set reads 1210 the record and modifies 1236 the user's risk score based on the record of the user's behavior and based on the record of the protection activities; wherein the adaptive protection computing system upon execution provides a functionality loop 302, 1100 in which the risk score influences (FIG. 11 steps A, C) the protection activities and the user's behavior as recorded in the computing system, and the protection activities and the user's behavior as recorded in the computing system influence (FIG. 11 steps D, E,) the risk score in turn, and the loop repeats multiple times over a period of at least one week.

The term "influence" has a particular meaning herein. A piece or set of data X (e.g., risk score 128 or event record 132) "influences" a computational mechanism (e.g., protection mechanism 124 or scoring model 312) when the data X is input to the computational mechanism and in at least one instance the computational mechanism operates differently in response to the data than how the computational mechanism would have operated without the data X as input. Similarly, the risk score influences the protection mechanism(s) which take the risk score as an input, which alters the operation of the protection mechanism in at least one instance, and thus influences the protection activities performed by the protection mechanism as well as influencing the user's behavior because that user behavior is directed or constrained by the protection mechanism.

Although the user's behavior is influenced by protection activities, user behavior is not itself part of any claimed process or other embodiment herein. For the purpose of claim interpretation, "user behavior" means a digital representation within a system 102 of user interactions with the system 102. The behavior data 132 may be associated with one or more of: a user identifier such as a user name or user number, a user object 516, or another machine (digital or computational or both) indicator of a human or human interaction with a system. Similarly, a user risk score may be associated with a user identifier, user object, or other data structure. However, it is data 118 that gets processed in a system, not human behavior per se. Human behavior is not a required element of any claim of any embodiment described herein, and any claim interpretation asserting otherwise is contrary to the present specification.

In some embodiments, the computing system 202 includes at least N of the following protection mechanisms, N being in the range from two to nine: a data confidentiality protection mechanism 402, a data integrity protection mechanism 404, a data retention governance protection mechanism 406, a device protection mechanism 408, a network access protection mechanism 410, a digital identity protection mechanism 412, an application protection mechanism 414, a physical facility protection mechanism 416, or a communications protection mechanism 418. Each of these protection mechanisms upon execution monitors a user's behavior and performs protection activities according the user's behavior and according to the risk score of the user, and records data representing the user's behavior in the protection mechanism record and records data representing the protection activities in the protection mechanism record.

In some embodiments, the computing system 202 includes at least one of the following security tools 318 which operationally depends on the risk score: an insider risk management tool 502, a data leak prevention tool 504, or a conditional access management tool 506.

In some embodiments, the computing system 202 includes an operating system 120, and the operating system upon execution by the processor set performs 1206 at least one of: collecting 802 on a device 101 local input signals 118 for the risk scoring model 312, or executing 810 locally on the device the risk scoring model 312.

In some embodiments, the risk scoring model 312 includes at least one of: a statistical risk scoring model 314, or a machine learning risk scoring model 310, and the risk scoring model compares 1208 the record of the user's behavior to a record of a past behavior of the user or to a record of a behavior of a peer group 520 of the user, or both.

In some embodiments, an adaptive protection computing system includes: a digital memory; a processor set including at least one processor, the processor set in operable communication with the digital memory; a record interface to a protection mechanism record; and a risk scoring model which upon execution by the processor set reads the protection mechanism record and modifies the user's risk score based on the protection mechanism record, the protection mechanism record including a user behavior data portion and a protection activities data portion.

In some embodiments, the adaptive protection computing system upon execution performs in a functionality loop in which the risk score influences the protection activities data portion and the user behavior data portion, and the protection activities data portion and the user behavior data portion influence the risk score in turn, and the loop repeats multiple times.

In some embodiments, the adaptive protection computing system further includes a protection mechanism which upon execution monitors a user's behavior and performs protection activities according the user's behavior and according to the risk score of the user, the protection mechanism also recording data representing the user's behavior in the protection mechanism record and recording data representing the protection activities in the protection mechanism record.

Other system embodiments are also described herein, either directly or derivable as system versions of described processes or configured media, duly informed by the extensive discussion herein of computing hardware.

Although specific adaptive protection architecture examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided in this disclosure to help illustrate aspects of the technology, but the examples given within this document do not describe all of the possible embodiments. A given embodiment may include additional or different kinds of security tools 318 or protection mechanisms 124, for example, as well as different technical features, aspects, software, expressions, operational sequences, data structures, environment or system characteristics, telemetry, logs, or other functionality consistent with teachings provided herein, and may otherwise depart from the particular examples provided.

Processes (a.k.a. Methods)

Processes (which are also be referred to as "methods" in the legal sense of that word) are illustrated in various ways herein, both in text and in drawing figures. FIGS. 8, 9, 10, 11, 12, and 13 each illustrate a family of processes 800, 900, 1000, 1100, 1200, and 1300 respectively, which are performed or assisted by some enhanced systems, such as some systems 202 or another adaptive protection enhanced system as taught herein. Process family 1200 is a superset containing each of the other process families 800, 900, 1000, 1100, and 1300.

FIGS. 1 to 7 illustrate adaptive protection system 202 architectures with implicit or explicit actions, e.g., data flow between a protected environment 210 and software 302, 208 in response to user interactions 306 with items in the protected environment 210, or data flow between protection mechanisms 124 and an insider risk detection tool 502, 318, or otherwise processing data 118, in which the data 118 includes, e.g., records 132, risk scores 128, user identities 430, or warnings 632, among other examples disclosed herein.

Technical processes shown in the Figures or otherwise disclosed will be performed automatically, e.g., by an enhanced system 202, unless otherwise indicated. Related non-claimed processes may also be performed in part automatically and in part manually to the extent action by a human person is implicated, e.g., in some situations a human 104 types in a login name 430. But no process contemplated as innovative herein is entirely manual or purely mental; none of the claimed processes can be performed solely in a human mind or on paper. Any claim interpretation to the contrary is squarely at odds with the present disclosure.

Figure 12:
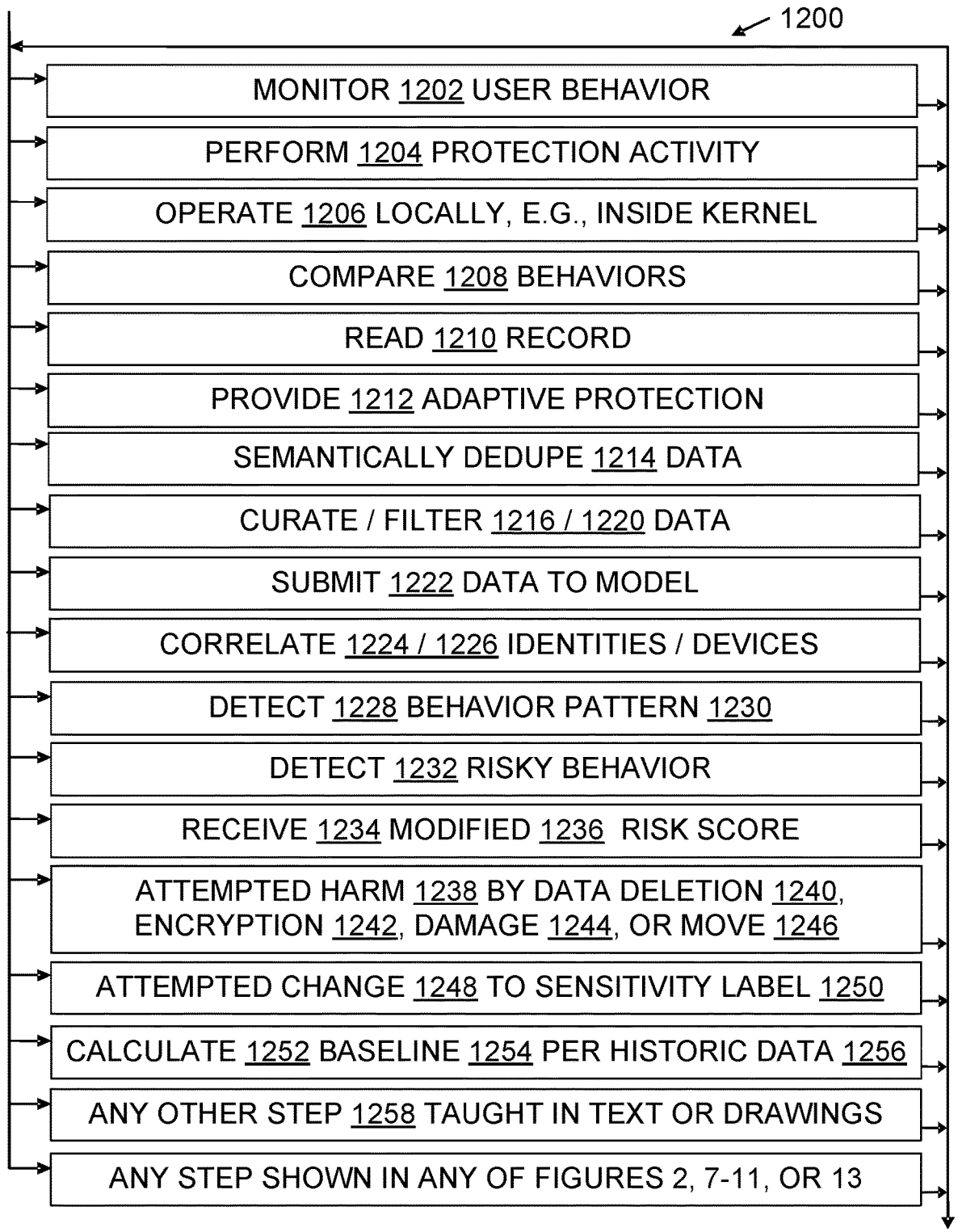
FIG. 12 is a flowchart further illustrating steps in some adaptive protection processes, and incorporating steps of FIGS. 2, 7-11, and 13.

In a given embodiment zero or more illustrated steps of a process may be repeated, perhaps with different parameters or data to operate on. Steps in an embodiment may also be done in a different order than the top-to-bottom order that is laid out in FIG. 12. FIG. 12 is a supplement to the textual examples of embodiments provided herein and the textual descriptions of embodiments provided herein. In the event of any alleged inconsistency, lack of clarity, or excessive breadth due to an aspect or interpretation of FIG. 12, the text of this disclosure shall prevail over that aspect or interpretation of FIG. 12.

Arrows in process or data flow figures indicate allowable flows; arrows pointing in more than one direction thus indicate that flow may proceed in more than one direction. Steps may be performed serially, in a partially overlapping manner, or fully in parallel within a given flow. In particular, the order in which flowchart 1200 action items are traversed to indicate the steps performed during a process may vary from one performance of the process to another performance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim of an application or patent that includes or claims priority to the present disclosure. To the extent that a person of skill considers a given sequence S of steps which is consistent with FIG. 12 to be non-operable, the sequence S is not within the scope of any claim. Any assertion otherwise is contrary to the present disclosure.

Some embodiments improve the security function of a computing system 202 in scenarios that involve multiple protection mechanisms, e.g., an effort by an insider to exfiltrate an organization's confidential 420 data despite a confidentiality protection mechanism 402 and to destroy the integrity 422 of the organization's local and archived copies of that data despite a data retention 424 protection mechanism 406.

Some embodiments provide or utilize an adaptive protection process 1200 performed by a computing system, in which the process includes monitoring 1202 a user's behavior and performing 1204 protection activities according to the user's behavior and according to a risk score of the user; recording 916 in at least one record 132 at least a portion of the user's behavior and recording 916 in the at least one record at least a portion of the protection activities; reading 1210 the at least one record and modifying 1236 the user's risk score based on the at least one record of the user's behavior and based on the at least one record of the protection activities; and providing 1212 adaptive protection 206 by repeating the monitoring, recording, reading, and modifying in a loop 1100, and repeating the loop at least ten times.

In some embodiments, the modifying 1236 includes curating 1216 data and submitting 1222 curated data to a risk scoring model, and curating 1216 data includes at least one of: semantically deduping 1214 data; filtering 1220 out a system-generated event 602 which was not generated 604 by a protection mechanism; or enriching 804 an event 130 with a classification 606 or metadata 608 in a record 132 of the event.

In some embodiments, the modifying 1236 includes submitting 1222 data to a risk scoring model, and the submitted data includes at least one of: human resources data 614; or a result 630 of a sentiment analysis 628 of a communication sent by the user.

In some embodiments, the modifying 1236 includes correlating 1224 multiple digital identities 430 to a single human actor.

In some embodiments, the modifying 1236 includes correlating 1226 multiple devices 101 to a single human actor.

In some embodiments, the modifying 1236 includes detecting 1228 at least one of the following behavior patterns 1230: the user performs a risky behavior 618, receives a warning 632, and stops the risky behavior; or the user performs a risky behavior 618, receives a warning 632, and continues the risky behavior 618 or performs another risky behavior 618, or both.

In some embodiments, the modifying 1236 includes detecting 1232 at least one of the following risky behaviors 618: an attempt to change 1248 a sensitivity label 1250 of a document; an attempt to harm 1238 data integrity 422 of particular data by deleting 1240 the particular data, encrypting 1242 the particular data, damaging 1244 the particular data, or moving 1246 the particular data to a location which has less availability than a current location of the particular data; or an attempt to harm 1238 data integrity 422 of an amount of data which is more than a threshold 610 amount of data by deleting 1240 the amount of data, encrypting 1242 the amount of data, damaging 1244 the amount of data, or moving 1246 the amount of data to a location which has less availability than a current location of the amount of data.

Some embodiments set 810 an initial risk score 128 at zero or another predetermined value which does not depend on user behavior or on protection activities. The initial risk score is the user's risk score prior to an initial iteration of the adaptive protection loop 1100. However, some other embodiments calculate 1252 a baseline 1254 based on behavior analytics 1256, e.g., user behavior or organization behavior for a specified period such as the preceding thirty days. In some cases, a baseline represents an organizational norm. Then the initial risk score 128 prior to the initial full iteration of the adaptive protection loop 1100 is computed using the baseline. Thus, different users or different organizations, or both, begin the adaptive protection loop with different initial risk scores.

In other words, thresholds that constitute the initial level of risk are influenced in some embodiments by historical patterns 1256 observed in the organization. For example, at an Organization A, five downloads from a SharePoint® site are suspicious, but at an Organization B, downloads would not be concerning unless the volume was greater than one hundred. Historical patterns indicate what is considered normal or expected activity; if 90% of an organization downloads a hundred files every day, then that activity is likely not unusual or risky in that organization.

The initial risk score is then modified during iterations of the loop 1100, as discussed herein. A benefit of calculating a first risk score at least partially from a baseline 1254 is that an embodiment's operation tends to produce fewer false positives for user risk scores, because the embodiment bases risk scores and recommendations or other activities 308 on norms of the specific organization which are based on the patterns observed in the organization.

Configured Storage Media

Some embodiments include a configured computer-readable storage medium 112. Some examples of storage medium 112 include disks (magnetic, optical, or otherwise), RAM, EEPROMS or other ROMs, and other configurable memory, including in particular computer-readable storage media (which are not mere propagated signals). A computer-readable storage device is an example of a storage medium 112. In some embodiments, the storage medium which is configured is in particular a removable storage medium 114 such as a CD, DVD, or flash memory. A general-purpose memory, which is be removable or not, and is volatile or not, depending on the embodiment, can be configured in the embodiment using items such as a risk scoring model 312, adaptive protection loop software 302, risk score 128, audit record 916, 132, and APIs of protection mechanisms 124, in the form of data 118 and instructions 116, read from a removable storage medium 114 and/or another source such as a network connection, to form a configured storage medium. The configured storage medium 112 is capable of causing a computer system 202 to perform technical process steps for providing or utilizing adaptive protection functionality 208, as disclosed herein. The Figures thus help illustrate configured storage media embodiments and process (a.k.a. method) embodiments, as well as system and process embodiments. In particular, any of the process steps illustrated in FIGS. 2 and 7-13, or otherwise taught herein, may be used to help configure a storage medium to form a configured storage medium embodiment.

Some embodiments use or provide a computer-readable storage device 112, 114 configured with data 118 and instructions 116 which upon execution by a processor 110 cause a computing system 202 to perform a process 1200 to adaptively modify security protection mechanism activities, the process including: reading 1210, from at least one record, user behavior data representing a user's behavior and protection activity data representing protection activities performed by protection mechanisms according to the user's behavior and according to a first risk score of the user; submitting 1222 at least a portion of the user behavior data and at least a portion of the protection activity data to a risk scoring model; receiving 1234 from the risk scoring model a second risk score of the user; and providing 1212 adaptive protection by repeating the reading, submitting, and receiving in a loop 1100, with the second risk score of a given iteration of the loop serving as the first risk score of the next iteration of the loop, and repeating the loop at least ten times.

In some embodiments, the user behavior data 132 and the protection activity data 132 each span at least two of the following workloads 624: an endpoint device 101 workload 624, a platform 622 workload 624, or an application 432 workload 624.

In some embodiments, the protection activity data 132 of a particular security tool 318 represents protection activity 308 of at least three of the following protection mechanisms 124 which communicate operationally and bidirectionally with the particular security tool 318: a data confidentiality protection mechanism 402, a data integrity protection mechanism 404, a data retention governance protection mechanism 406, a device protection mechanism 408, a network access protection mechanism 410, a digital identity protection mechanism 412, an application protection mechanism 414, a physical facility protection mechanism 416, or a communications protection mechanism 418.

Additional Observations

Additional support for the discussion of adaptive protection functionality 208 herein is provided under various headings. However, it is all intended to be understood as an integrated and integral part of the present disclosure's discussion of the contemplated embodiments.

One of skill will recognize that not every part of this disclosure, or any particular details therein, are necessarily required to satisfy legal criteria such as enablement, written description, best mode, novelty, nonobviousness, inventive step, or industrial applicability. Any apparent conflict with any other patent disclosure, even from the owner of the present innovations, has no role in interpreting the claims presented in this patent disclosure. With this understanding, which pertains to all parts of the present disclosure, examples and observations are offered herein.

Some embodiments dynamically balance security control strictness against user productivity. These embodiments reduce or avoid static one-size-fits-all policies, default enforcements that are not tailored to a current context, and overwhelming administrators with routine access requests or false positive alerts. Some embodiments utilize a user's risk profile to adaptively drive automated protective controls 124 across multiple control planes 420, 422, 426, 428, 430. Furthermore, in some embodiments the user's profile 1312 is dynamic in nature and continues to get enriched in a constant feedback loop 1100 by the user's activities in those control planes, assigning 810 the risk based on the actions performed and thereby suitably limiting or enhancing the usage rights, in a manner that adheres to compliance standards and meets the needs of a cloud tenant or other organization of users 104.

An alternative approach to determining user risk levels and usage allowances involves manual intervention by admins. Embodiments taught herein beneficially avoid burdening admins in that way, by constantly incorporating feedback from user's activity in various control planes and adjusting their risk profile so the controls that are applied to the user adapt to the risk posed by the user over time.

Figure 11:
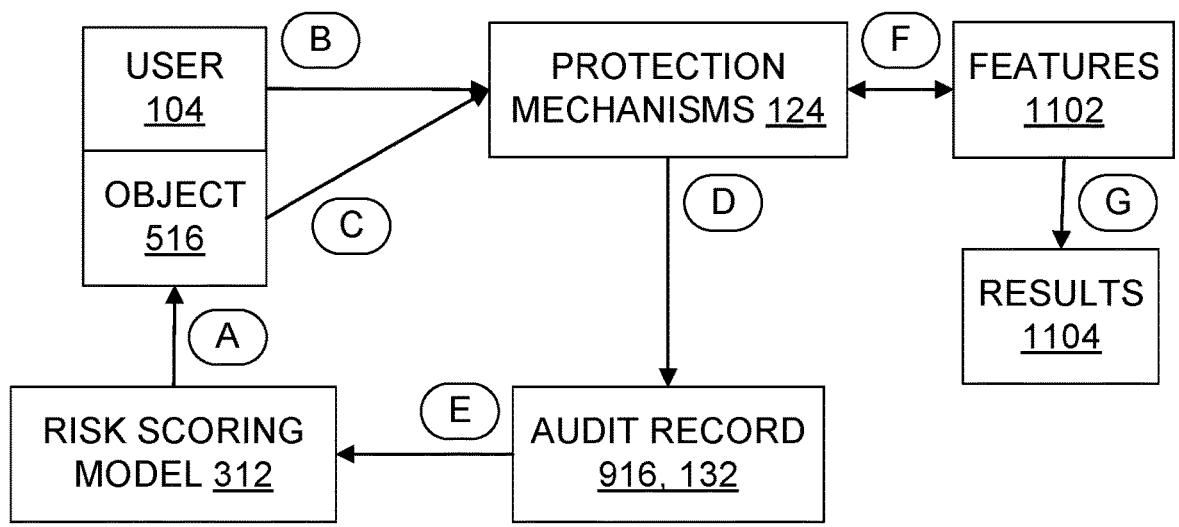
FIG. 11 is a data flow diagram illustrating aspects of an example adaptive protection loop.
Figure 13:
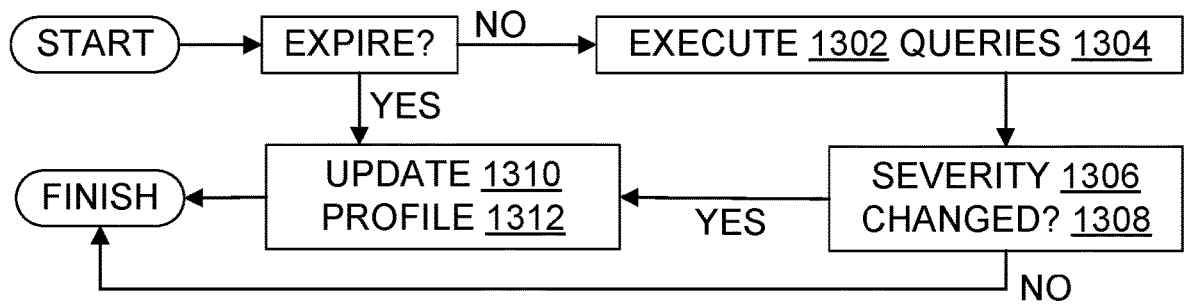
FIG. 13 is a flowchart illustrating steps in some user risk profile update processes.

In some embodiments, a model 312 computes risk scores based primarily on records 132 of human behavior. The resulting risk scores influence security controls, e.g., data, device, network, identity, and app controls, as illustrated for example in FIG. 7. The risk scores are in turn influenced by bidirectional input signals from these security controls, e.g., as illustrated in FIG. 11. FIG. 11 depicts embodiments which include multiple features 1102, e.g., multiple workloads 624 of one or more kinds (platforms 622, applications 432, or devices 101).

In some embodiments, adaptive protection (also referred to as dynamic risk prevention or dynamic risk protection) provides data confidentiality protection. For example, an insider risk management tool 502 identifies a risky user based on user context (e.g., employment events 614, communication risks 630, risky activity patterns 1230) and assigns a risk profile 1312 to the user. This risk profile is dynamically shared with data loss prevention (DLP) solution 402 to provide protection controls based on the risk profile level. If a user has a higher risk profile level, then the data protection controls are ramped up to be more restrictive. The input signals from DLP are also used again, to recalibrate 1236 the risk of the user.

Some embodiments manage multiple control planes without human intervention, e.g., across data, identity, device, network, and app control planes. When a user is detected as posing a risk to an organization, a security wall goes up around the user to reduce or prevent harm to the organization from risky user activity with data, with the user's identity, on their device, on the network, and apps. To enhance computational efficiency and user productivity, when the risk goes down, the security wall also gets lower.

Some embodiments utilize a bi-directional feedback loop across the user's risk profile and the various control planes, e.g., in a hub and spokes architecture like the one shown in FIG. 7. A user's risk profile is enriched based on the activities observed across control planes. For example, if a user is continually ignoring warnings presented to them from DLP, then that user's risk profile is increased, not merely with regard to a data control plane but also with regard to app control, network control, identity control, and so on. Conversely, if they accept warnings, then the user's risk profile is decreased.

Example Scenario A: Pat has submitted their resignation to their employer (Contoso) and is detected performing anomalous download activity from confidential SharePoint® sites (mark of Microsoft Corporation). As a result, Pat is assigned a Medium Risk profile 1312, 128 and is dynamically scoped into a DLP policy 522 that will warn them when they try to send emails externally, upload to a cloud, or copy to a universal serial bus (USB) drive. Three days later, Pat performs more anomalous download activity from a SharePoint® site and is upgraded to a High Risk profile. With this new riskiness, Pat now gets blocked when they try to send emails externally, upload to cloud, or copy to USB. Over the next three days, Pat does not perform any additional risky activity and is also accepting all of the blocks they get from DLP, instead of overriding them. As a result of this, Pat is decreased to a Medium Risk profile again.

Example Scenario B: An embodiment helps prevent a data leak 510 of sensitive documents by a careless user. In a detection portion of this scenario, an insider risk management (IRM) tool 502 identifies a careless user clicking on phishing links and browsing to malicious websites during office hours using organization resources, downloading large volume of documents from cloud storage and printing anomalously large volumes of documents. This detection is based on browser 432 input signals 132, office productivity software 432 input signals 132, device 101 input signals, and network access 428 input signals 132. Network access 428 includes, e.g., attempted or actual access to a network which is not authorized. Input signals 132 are also generated in some embodiments in this scenario by a conditional access management tool 506.

In a prevention portion of this scenario, the user is dynamically added to a DLP policy 522 which prevents the user (block control 402) from exfiltrating any document with a "Confidential" label until the user's behavior improves. In a feedback portion of this scenario, within a day the user stops hoarding large volumes of files and stops visiting malicious websites. These actions are noted 132. In an adaptive response portion of this scenario, the user risk is lowered such that in the DLP policy the user will be warned with an override policy instead of blocked.

In terms of loop 1100 iterations, one of the sets of values 128, 132 which is consistent with this scenario is the following, in which a loop iteration begins at 1 merely for convenience and not to require that no prior loop iterations precede it in a given embodiment:

Loop iteration 1: risk score=low, record=browsing to malicious websites
Iteration 2: risk score=low, record=download documents from cloud storage
Iteration 3: risk score=medium, record=added to DLP policy
Iteration 4: risk score=medium, record=exfiltration blocked
Iteration 5: risk score=medium, record=free of risky behavior
Iteration 6: risk score=medium, record=free of risky behavior
Iteration 7: risk score=low, record=warned, accepts warning
Iteration 8: risk score=low, record=free of risky behavior In a variation, when the user hits a restriction on their managed work computer, the user tries the risky behavior again on a managed phone. However, because the records 132 from the devices are fed to the risk model, and the risk score is sent to protection mechanisms on each device, the risky behavior fails in each case and the risk score reflects both attempts. In other variations, the user tries to login to an unmanaged device, or tries different login identities, or both. However, some embodiments correlate 1224, 1226 all these attempts with the same human person, so protections are activated and all of the attempts are factored into the risk score.

Example Scenario C: An embodiment helps prevent data theft by a malicious insider. In a detection portion of this scenario, an IRM tool 502 identifies a user who is downloading anomalous volumes of sensitive content, downgrading sensitivity labels from Highly Confidential to Non-Confidential, and uploading content to personal cloud services at rates anomalous compared 1208 to their peer groups. This detection is based on input signals from several workloads 624.

In a prevention portion, the user is dynamically added to a DLP policy 522 that gives a warning to the user when they try to exfiltrate documents. In a feedback portion of this scenario, the user is given the warnings five times in two days, but the user overrides the warnings and is still attempting to exfiltrate documents. The resulting input signals 132 are sent back and recorded by the IRM tool. In an adaptive response portion, the user's risk 128 is increased because the user received several warnings and is still observed to be exfiltrating data. The user is dynamically moved to a DLP policy that will now block the user when the user tries to exfiltrate documents.

In terms of loop 1100 iterations, one of the sets of values 128, 132 which is consistent with this scenario is the following, in which a loop iteration begins at 1 merely for convenience and not to require that no prior loop iterations precede it in a given embodiment:

Loop iteration 1: risk score=low, record=downloading lots of sensitive content Iteration 2: risk score=low, record=downgrading sensitivity labels, uploading to personal cloud
Iteration 3: risk score=medium, record=added to DLP policy A
Iteration 4: risk score=medium, record=one exfiltration warning given, overridden
Iteration 5: risk score=medium, record=four exfiltration warnings given, all overridden
Iteration 6: risk score=high, record=moved to DLP policy B, exfiltration blocked Example Scenario D: An embodiment helps disable digital identities of users in a planned layoff. In a detection portion of this scenario, an IRM tool 502 curates an input signal from HR 612 systems indicating a user is part of upcoming planned layoff. In a prevention portion, the user is dynamically added to a conditional access 512 policy 522, 124 that will prevent the user from logging in with their corporate identity. Conditional access means access is conditioned upon meeting one or more predefined criteria, which are specified, e.g., in a policy. The policy is in place until the user is off boarded. In a variation, after the user is blocked from using the corporate ID 430, the user tries a different device or a different login identity, but remains locked out.

With regard to different login identities, many privileged users have multiple login identities, e.g., a primary login, one or more admin logins, and sometimes an alternate login for high sensitivity data. Also, some users when blocked will attempt to coopt a machine account, such as a service account that has interactive login enabled. Some embodiments correlate 1224 different user accounts with a single human, e.g., based on one or more of: name, employee number, or other identifying information provided when an account is created or registered, IP address, similar activity patterns within a short (e.g., five minute) period, browser ID, operating system ID, user agent data, device ID, or data of the kind used in tracking activity for targeted personalized advertising.

Example Scenario E: An embodiment helps disable digital identities of users in a planned layoff. In a detection portion of this scenario, an IRM tool 502 curates an input signal from HR 612 systems indicating a user is part of an upcoming planned layoff. The user is also observed to be copying anomalous amounts or kinds of files to USB. In a prevention portion, the user is dynamically added to a conditional access 512 policy 124 that will show the user a Terms of Use notice 632 when the user logs into corporate resources to remind the user of their confidentiality obligations. The user must accept the Terms of Use in order to proceed. In a feedback portion, the user accepts the Terms of Use notice several times, and the acceptance is logged 132, but the IRM tool continues to detect the user copying files with sensitivity labels to cloud or USB. In an adaptive response portion, the user's risk 128 is increased because of the evident wrongful intent. The user is dynamically added to a stricter conditional access 512 policy 522, that prevents the user from logging in with their corporate identity.

Example Scenario F: An embodiment helps prevent a disgruntled employee from causing widespread harm. In a detection portion of this scenario, an IRM tool 502 notes a negative communication sentiment 626 whereby a user is complaining about the company leadership and strategy. The IRM tool also detects the user is communicating with competitors. In a prevention portion, the user is dynamically added to a Records Management (RM) policy for preventative data retention 424, and thus the user is unable to delete records from corporate document repositories.

Example Scenario G: An embodiment helps prevent a user from deleting important information or amending databases. In a detection portion of this scenario, an IRM tool identifies a user who is doing high volumes of deletion 1240 and editing of data from a shared location. In a prevention portion, the user is dynamically added to an adaptive scope of Data Lifecycle Management (DLM) 426 policies based on the risk associated. Retention policies are configured to avoid loss of data by such risky users. In a feedback portion, the user is warned against such deletions and then stops doing such actions. This is reported back to IRM and used to re-calculate the risk level over a period of time, e.g., six days, or up to three weeks. In an adaptive response portion, the user's risk score is lowered and the user is moved out of the adaptive scope for IRM and DLM.

Example Scenario H: An embodiment helps manage insider risk. In a detection portion of this scenario, the user has downloaded multiple documents over a period of time, but the behavior is not a significant departure in quantity from behavior of the user's peer groups 520. This user goes through two rough patches with some team members, detected through sentiment escalations in conversations over a month. The embodiment also detects when this user logs into a specific collaboration platform, and notes network locations where only a read is nominally performed but potentially screenshots are also being taken. Then this user goes to an unmanaged device to log into the same apps. After this behavior 306, the embodiment detects small quantities of the same data which the user downloaded as it is sent out of the organization through email to an external mail address, uploaded to cloud, copied to USB, and similar data transfer operations. The user is warned 632, despite the data quantity being within nominal amounts in comparison 1208 to the user's peer groups, because of the detected pattern 1230 of adverse sentiment followed by visits to locations having sensitive data followed by small but continual exfiltration actions. The embodiment correlates the historic sensitive data downloads to egress out of channels even while they are seen to be normal in size, because this user's communication behavior was not within expected norms. After a week, this user also decides to quit the company, as noted in HR data 132 input signal.

In a prevention portion of this scenario, the user is dynamically added to a DLP policy which prevents the user (via block control) from exfiltrating all the historic documents via email, or upload to external storage or endpoint channels. Also, the user is added to a conditional access policy to prevent any more access to the network and the apps, thus stopping access to locations having sensitive information. In a feedback portion, the user's activity is monitored and feedback is sent in the loop 1100 to prevent the sensitive information of the company being leaked. In an adaptive response portion, the user's actions are monitored to categorize the user's risk level until the user's last day at the organization, when the user's accounts and managed devices belonging to the organization are all disabled.

In some embodiments and scenarios, an insider risk profile is dynamic and the profile risk level increases as the user performs risky activity, or has associated input signals that indicate a risky status (e.g., the user has submitted their resignation or they have a disgruntlement indicator). This risk level can decrease as the user's activity becomes less risky and more compliant. The protective control actions that are taken are correlated with the user's risk profile level. As the profile increases, more restrictive controls are progressively applied.

Some examples of a "machine privilege control" (a.k.a. "control plane") include data movement control (e.g., DLP control), data governance control, device protection control, network protection control, identity protection control, and application (a.k.a. "app") protection control.

A "machine privilege control user response" is one of: compliance, override (express, or implicit by trying to accomplish the same prohibited result using different operations), or violation (either merely attempted or actually accomplished).

Some examples of a "user characteristic" include user's title, role, or position (e.g., level in an organization), user's public visibility, employment status (e.g., active, resignation submitted, terminated). User characteristics data are independent of any machine privilege control, but may be input to a model 312.

Some embodiments use or implement an adaptive cybersecurity method which includes repeating 1100 the following for a particular user for each of at least two time periods: updating a risk score of the user and modifying a machine privilege control of the user, the updating and the modifying each based on at least a prior period risk score of the user and also based on at least two machine privilege control responses of the user to at least two respective machine privilege controls, including at least one machine privilege control which is not a data movement control.

In some adaptive cybersecurity method embodiments, a first risk score can be based on user characteristics which are independent of any machine privilege control. In some embodiments the adaptive cybersecurity method includes calculating 810 a first risk score of the user for a first period prior to the two time periods, wherein the first risk score is based on a user characteristic 614, 630 that is independent of any machine privilege control.

In some adaptive cybersecurity method embodiments, the updating and the modifying are each based on a response of the user to at least one machine privilege control in the following set of machine privilege controls: device protection control 408, network protection control 410, identity protection control 412, or application protection control 414.

Some embodiments update a user's insider risk score and the user's machine privilege(s), based on: the user's first risk score (e.g., from some prior time frame), first machine privilege control that is based on the first risk score (e.g., the user's first machine privilege gets limited/controlled based on the user's first risk score), and response activity (e.g., the user's compliance with, or violation of the first machine privilege control).

In some embodiments, a first portion of overall insider risk score is based on first characteristics (e.g., the first user's static characteristics such as level in an organization along with the user's first activities, that are independent of a limit/control on machine privilege) and a second portion of overall insider risk score is based on response activities (e.g., user activities that are dependent on the limit/control on machine privilege). Some embodiments include ongoing dynamic feedback regarding both types of activities, which affect the overall insider risk score and a second machine privilege control that gets applied. In some embodiments, the second portion is aggregated from multiple sub-portions, each sub-portion corresponding to a different type of machine privilege control/limitation (e.g., control plane) such as data loss protection control, identity protection control, network protection control, etc.

Some embodiments include or utilize an adaptive protection solution with a loop like this: multiple protection mechanisms monitor a user's behavior and perform protection activities according the user's behavior and according to a risk score of the user, the protection mechanisms also record the user's behavior and record the protection activities, a risk scoring model reads those records and modifies the user's risk score based on the user's behavior and the protection activities, and the loop repeats.

In some embodiments, multiple protection mechanisms monitor a user's behavior, and protection mechanisms record the user's behavior and record the protection activities. A risk scoring model reads those records and modifies the user's risk score based on user behavior and protection activities. Then the protection mechanisms perform protection activities based on the user's behavior and the user's risk score. The protection mechanisms further monitor how the user behaves in response to the protection activities; the loop continues.

In some embodiments, some examples of protection mechanisms include: data confidentiality protection, data integrity protection, data retention governance protection, device protection, network access protection, identity protection, application protection, and physical facility protection. Some embodiments include communications controls, e.g., tools that monitor a user's communications, identify potential risky communications like harassment or violence, and implement restrictions based on those detections. Some control restrictions include blocking communication by the user, blocking data sharing, or blocking data exfiltration. With regard to monitoring user communications and all other steps discussed wherein, it is assumed a given implementation will comply with all applicable privacy regulations and laws in the jurisdiction in question.

In some embodiments, the risk scoring model modifies the user's risk score based on the record of the user's behavior and the record of the protection mechanisms' activities. In addition, some risk scoring models also use one or more of the following inputs as a basis for modifying the user's risk score: results from sentiment analysis of communications by the user, or human resources input signals such as user employment status (e.g., normal, resigned, scheduled for termination), or user employment performance (e.g., performance review, demotion, promotion, job role).

In some embodiments, the risk scoring model looks for one of these patterns:
a) The user performs risky behavior, receives a warning, and stops the risky behavior. This tends to reduce the user's risk score. In this context, "performs" risky behavior includes attempting an unauthorized behavior, whether the attempt succeeds or not.
b) The user performs risky behavior, receives a warning, and continues the risky behavior. This tends to increase the user's risk score. The warning could be, e.g., a reminder of: the system or application terms of use, company policy, regulatory or other legal requirements, or terms in an employment agreement.

In some embodiments, records of the user's behavior and the protection mechanisms' activities may span multiple workloads. Some examples of workloads include: endpoint devices, platforms (e.g., SharePoint®, GitHub®, Salesforce®, ServiceNow®, AWS® (marks of their respective owners)), and apps (e.g., email services, cloud access services, physical badging system app, HR app).

In some embodiments, the adaptive protection solution correlates multiple login IDs to a single human actor, in order to provide adaptive protection in a scenario where a user performs risky behavior under a first login ID, is stymied by one or more protection mechanisms, and then performs the same or similar risky behavior under a second login ID. The second login ID could be, e.g., an admin ID, or a service account ID.

In some embodiments, the adaptive protection solution correlates multiple devices to a single human actor in order to provide adaptive protection in a scenario where a user performs risky behavior on a first device, is stymied by one or more protection mechanisms, and then performs the same or similar risky behavior on a second device.

In some embodiments, the adaptive protection solution software is put into practice as part of insider risk management, data leak prevention, or conditional access management, for example.

In some embodiments, the adaptive protection solution's software to collect input signals for risk modeling is embedded in an operating system. Operation 1206 of risk modeling input collection in the operating system allows local/native input signal collection, which is more CPU efficient, memory efficient, and bandwidth efficient than using separate agents deployed for input signal collection.

In some embodiments, the adaptive protection solution's software to perform risk modeling is embedded in an operating system. Operation 1206 of risk modeling in the operating system allows local/native risk modeling, which is more CPU efficient, memory efficient, and bandwidth efficient than using a separate third-party service to perform risk modeling.

In some embodiments, the adaptive protection solution collects input signals, curates the input signals, computes a user risk score based on the input signals, and makes the risk score available to the protection mechanisms. Some embodiments enrich 804 events with exclusions configured in settings, with priority content configured in policies, with sensitivity labels, or with sensitive info types.

Some embodiments aggregate 806 and generate 808 insights 514 by correlating input signals for a user. During these steps, some embodiments compute whether input signal thresholds meet a policy configuration. Some execute a potential high impact user model based on one or more of influence, access, or admin roles. Some execute a cumulative exfiltration anomaly detection model. Some apply a probability density function. Some perform a peer group computation. Some perform sequencing.

Some embodiments compute 810 a risk level 128 as an elevated, moderate, or minor risk level based on insights for the user. In some, the risk level 128 is numeric.

Some embodiments publish 812 a risk level by tagging 814 a user's object 516 with the risk level and publishing the object to an object store 518.

In some embodiments, curating 1216 input signals sometimes includes semantic deduping 1214. For instance, 500 file saves during editing of a file F by a user X is semantically deduped as "user X is working on file F" based on pattern recognition.

In some embodiments, curating 1216 input signals sometimes includes enriching 804 events by noting a classification or metadata in the record of an event, e.g., noting that a file copied by a user contains credit card data or personal health data, or noting that editing added confidential information to a file or removed confidential information from the file.

In some embodiments, curating 1216 input signals sometimes includes filtering 1220 out system-generated events which were not generated by protection mechanisms. For instance, transaction events logged by an online transaction processing system of a consumer-facing web store are filtered out.

Some protection tools similar to Azure® Active Directory® services (mark of Microsoft Corporation) perform multiple protection activities, e.g., ID 412, Device 408, and App 414 protection mechanisms may be part of a single tool 318, and be enhanced for looping 1100 according the user's behavior and the user's risk score.

In some embodiments, a DLP process 900 includes getting 902 user risk profile levels, which were generated, e.g., by an IRM tool 502. The process 900 also includes creating 904 DLP rules 906 for dynamic and adaptive conditions. For instance, a DLP policy rule may have a condition that applies to users of certain risk level: Minor, Moderate, or Elevated. An example DLP rule 906 is: If user is Minor Risk Level, then provide a tooltip when user emails externally; if user is Moderate risk level, then block with override possible by user when user emails externally; if user is Elevated risk level, then block outright when user emails externally. The process 900 also includes applying 908 rules dynamically. The embodiment dynamically checks the risk level of the user performing the activity, and if it is found to be risky, the embodiment applies the protective actions and generates alerts or policy tips as per the configuration. The process 900 also includes recording 910 when a DLP rule is matched and recording 910 the user response as an interaction in the system. For instance, if a user is blocked and then provides an override, these events are logged: User A is blocked due to DLP Rule ABC; User A provided override to DLP Rule ABC. The process 900 also includes publishing 914 the rule match and user response to an audit 916, which becomes an input to the risk model 312 in the loop 1100. The process 900 increases security accuracy, in that the manner in which a user responds to security controls can be used to further enrich their risk level that drives the security controls.

In some embodiments, a conditional access (CA) process 1000 includes getting 902 user risk profile levels, which were generated, e.g., by an IRM tool 502. The process 1000 also includes applying 1002 a condition match 1004 for conditional access rules 1006. Each CA policy rule can have a condition to apply a rule when user has a certain risk level: Minor, Moderate, or Elevated. An example CA rule 1006 is: If user is Minor Risk Level, then provide terms of use when user logs in to app; if user is Moderate risk level, then require multifactor authentication when user signs into app; if user is Elevated risk level, then block sign-in. The process 1000 also includes recording 910 when a CA rule is matched 1004 and recording 910 the user response as an interaction in the system. For instance, if the user receives a Terms of Use and accepts it, then log these events: User A received Terms of use for CA Rule ABC, User A accepted terms of use. The process 1000 increases security accuracy, in that the manner in which a user responds to security controls can be used to further enrich their risk level that drives the security controls.

In some embodiments and situations, risky behavior by a user includes one or more of the following: an attempt to change a sensitivity label of a document; or an attempt to "burn the house down" by deleting lots of data or very sensitive data, encrypting it, damaging it, or moving it someplace that reduces availability.

In some embodiments, the risk scoring model is a statistical model or a machine learning model. The risk scoring model compares the user's behavior to the user's past behavior or the behavior of the user's peer groups (the user's company is one kind of peer group), or both.

In some embodiments, examples of protective activities include one or more of: data protection {block upload, warn on copy to USB}, data governance {enforce retention limits, restrict access to repository}, device protection {remote wipe, encrypt full drive}, network protection {restrict network locations, restrict access window}, identity protection {disable identity, downgrade role}, app protection {restrict SaaS access, restrict website access}. These are merely examples, not a comprehensive list.

Some embodiments include or utilize a MainRiskProfileProcessor process. This process starts by checking whether a MainRiskProfileProcessor continuation token is empty. While the continuation token is not empty, this MainRiskProfileProcessor process gets a page of tenants from a database, calls a TenantRiskProfileProcessor process for each tenant, waits for the TenantRiskProfileProcessor processing to finish, and then loops back to check whether the MainRiskProfileProcessor continuation token is empty. When the continuation token is empty, the MainRiskProfileProcessor process ends.

The TenantRiskProfileProcessor process starts by getting a tenant setting from a database, and checking whether a particular protection mechanism 124 (or in a variation, a set of mechanisms 124, or in another variation dynamic risk protection a.k.a. adaptive protection) is onboarded (enabled). If it is not, the TenantRiskProfileProcessor process ends. If it is onboarded, then the TenantRiskProfileProcessor process checks a continuation token of its own, and loops until the continuation token is empty. In this loop body, the TenantRiskProfileProcessor gets a page of new and active profiles 1312, calls a UserRiskProfileProcessor process for each profile 1312 found, waits for the UserRiskProfileProcessor processing to finish, and then loops back to check whether the TenantRiskProfileProcessor continuation token is empty. When the TenantRiskProfileProcessor continuation token is empty, the TenantRiskProfileProcessor process ends.

The UserRiskProfileProcessor process reads the input and sets a newSeverity to None. Then the UserRiskProfileProcessor process queries whether the profile 1312 should be expired. If yes, the UserRiskProfileProcessor process sets the profile's status to Expired, sets a time to live for the profile, updates the profile in the database, and ends. If no (do not expire), then the UserRiskProfileProcessor process runs to determine whether High, Medium, or Low risk level conditions match, and if any does it sets newSeverity accordingly. Then the UserRiskProfileProcessor process checks whether newSeverity is different from None and greater than a currentSeverity. If this is not the case, then the UserRiskProfileProcessor process ends. If it is the case, then the UserRiskProfileProcessor process sets the profile's status to Active, sets the currentSeverity to the newSeverity, extends the expiration date and time to live per the settings, updates the profile in the database, and ends.

In some embodiments, a user risk profile 1312 includes a login ID, a risky user ID, a SaaS ID, a user principal name, a severity (None, Low, Medium, or High), a status (New, Active, Expired, or ManualReset), a workload type, an ExpirationDate Time, and a time to live. Some variations have fewer or different IDs, different severity values, different status values, no workload type, or only one of the ExpirationDateTime or time to live fields, for example.

Technical Character

The technical character of embodiments described herein will be apparent to one of ordinary skill in the art, and will also be apparent in several ways to a wide range of attentive readers. Some embodiments address technical activities such as writing and reading event logs 132 and user risk profiles 1312, executing risk scoring models 312, executing security protection mechanisms 124, and executing software features 1102 in a computing environment 210, which are each an activity deeply rooted in computing technology. Some of the technical mechanisms discussed include, e.g., security protection mechanisms 124, risk scoring models 312, security tools 318, and interfaces 316, 320. Some of the technical effects discussed include, e.g., risk scores 128 based on user responses to warnings 632, protection activities 308 based on detections 1228 of user behavior patterns 1230, and prevention of loss or damage from careless or malicious insider (e.g., employee or other authorized user) interactions with a computing system 210. Thus, purely mental processes and activities limited to pen-and-paper are clearly excluded. Other advantages based on the technical characteristics of the teachings will also be apparent to one of skill from the description provided.

Software cybersecurity is a technical activity which cannot be performed mentally, or entirely by pen and paper. One of skill understands that it is effectively software functionality, because its efficiency and effectiveness—or lack thereof—translates into software that functions efficiently and effectively—or does not. Improvements described herein to software cybersecurity tools, e.g., enhancements 208, are accordingly improvements in software functionality.

Different embodiments provide different technical benefits or other advantages in different circumstances, but one of skill informed by the teachings herein will acknowledge that particular technical advantages will likely follow from particular innovation features or feature combinations, as noted at various points herein. Any generic or abstract aspects are integrated into a practical application such as an enhanced insider risk management tool 506, enhanced data leak prevention tool 504, or enhanced conditional access management tool 506.

Some embodiments described herein may be viewed by some people in a broader context. For instance, concepts such as efficiency, reliability, user satisfaction, or waste may be deemed relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems, such as how to balance security against productivity in insider risk scenarios, and how to reduce or eliminate evasion of security controls by users who have multiple devices or multiple accounts or both. Other configured storage media, systems, and processes involving efficiency, reliability, user satisfaction, or waste are outside the present scope. Accordingly, vagueness, mere abstractness, lack of technical character, and accompanying proof problems are also avoided under a proper understanding of the present disclosure.

Additional Combinations and Variations

Any of these combinations of software code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

More generally, one of skill will recognize that not every part of this disclosure, or any particular details therein, are necessarily required to satisfy legal criteria such as enablement, written description, or best mode. Also, embodiments are not limited to the particular scenarios, motivating examples, operating environments, tools, peripherals, software process flows, identifiers, data structures, data selections, naming conventions, notations, control flows, or other implementation choices described herein. Any apparent conflict with any other patent disclosure, even from the owner of the present innovations, has no role in interpreting the claims presented in this patent disclosure.

Acronyms, Abbreviations, Names, and Symbols

Some acronyms, abbreviations, names, and symbols are defined below. Others are defined elsewhere herein, or do not require definition here in order to be understood by one of skill.

ALU: arithmetic and logic unit
API: application program interface
BIOS: basic input/output system
CD: compact disc CPU: central processing unit
DVD: digital versatile disk or digital video disc
FPGA: field-programmable gate array
FPU: floating point processing unit
GDPR: General Data Protection Regulation
GPU: graphical processing unit
GUI: graphical user interface
HTTPS: hypertext transfer protocol, secure
IaaS or IAAS: infrastructure-as-a-service
ID: identification or identity
IDE: integrated development environment
IL: intermediate language
LAN: local area network
OS: operating system
PaaS or PAAS: platform-as-a-service
RAM: random access memory
ROM: read only memory
TPU: tensor processing unit
UEFI: Unified Extensible Firmware Interface
UI: user interface
WAN: wide area network Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The present disclosure asserts and exercises the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

A "computer system" (a.k.a. "computing system") may include, for example, one or more servers, motherboards, processing nodes, laptops, tablets, personal computers (portable or not), personal digital assistants, smartphones, smartwatches, smart bands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

A "routine" is a callable piece of code which normally returns control to an instruction just after the point in a program execution at which the routine was called. Depending on the terminology used, a distinction is sometimes made elsewhere between a "function" and a "procedure": a function normally returns a value, while a procedure does not. As used herein, "routine" includes both functions and procedures. A routine may have code that returns a value (e.g., sin(x)) or it may simply return without also providing a value (e.g., void functions).

"Service" means a consumable program offering, in a cloud computing environment or other network or computing system environment, which provides resources to multiple programs or provides resource access to multiple programs, or does both. A service implementation may itself include multiple applications or other programs.

"Cloud" means pooled resources for computing, storage, and networking which are elastically available for measured on-demand service. A cloud may be private, public, community, or a hybrid, and cloud services may be offered in the form of infrastructure as a service (IaaS), platform as a service (PaaS), software as a service (Saas), or another service. Unless stated otherwise, any discussion of reading from a file or writing to a file includes reading/writing a local file or reading/writing over a network, which may be a cloud network or other network, or doing both (local and networked read/write). A cloud may also be referred to as a "cloud environment" or a "cloud computing environment".

"Access" to a computational resource includes use of a permission or other capability to read, modify, write, execute, move, delete, create, or otherwise utilize the resource. Attempted access may be explicitly distinguished from actual access, but "access" without the "attempted" qualifier includes both attempted access and access actually performed or provided.

Herein, activity by a user refers to activity by a user device or activity by a user account, or by software on behalf of a user, or by hardware on behalf of a user. Activity is represented by digital data or machine operations or both in a computing system. Activity within the scope of any claim based on the present disclosure excludes human actions per se. Software or hardware activity "on behalf of a user" accordingly refers to software or hardware activity on behalf of a user device or on behalf of a user account or on behalf of another computational mechanism or computational artifact, and thus does not bring human behavior per se within the scope of any embodiment or any claim.

"Digital data" means data in a computing system, as opposed to data written on paper or thoughts in a person's mind, for example. Similarly, "digital memory" refers to a non-living device, e.g., computing storage hardware, not to human or other biological memory. "Data" means one or more data values.

"Activities" means one activity or multiple activities.

"User's behavior" and "user behavior" are used interchangeably herein to mean interaction(s) of a user with a computing system as represented by data, with the understanding that behavior per se of a human user is not part of any claimed embodiment.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided. Steps performed automatically are presumed to include at least one operation performed proactively.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment, particularly in real-world embodiment implementations. Adaptive protection operations such as reading and writing logs or profiles, execution risk scoring models, executing protection mechanisms, and many other operations discussed herein, are understood to be inherently digital. A human mind cannot interface directly with a CPU or other processor, or with RAM or other digital storage, to read and write the necessary data to perform the adaptive protection steps 1200 taught herein even in a hypothetical prototype situation, much less in an embodiment's real world large computing environment. This would all be well understood by persons of skill in the art in view of the present disclosure.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

"Based on" means based on at least, not based exclusively on. Thus, a calculation based on X depends on at least X, and may also depend on Y.

Throughout this document, use of the optional plural "(s)", "(es)", or "(ies)" means that one or more of the indicated features is present. For example, "processor(s)" means "one or more processors" or equivalently "at least one processor".

"At least one" of a list of items means one of the items, or two of the items, or three of the items, and so on up to and including all N of the items, where the list is a list of N items. The presence of an item in the list does not require the presence of the item (or a check for the item) in an embodiment. For instance, if an embodiment of a system is described herein as including at least one of A, B, C, or D, then a system that includes A but does not check for B or C or D is an embodiment, and so is a system that includes A and also includes B but does not include or check for C or D. Similar understandings pertain to items which are steps or step portions or options in a method embodiment. This is not a complete list of all possibilities; it is provided merely to aid understanding of the scope of "at least one" that is intended herein.

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

One of skill will recognize that this innovation disclosure discusses various data values and data structures, and recognize that such items reside in a memory (RAM, disk, etc.), thereby configuring the memory. One of skill will also recognize that this innovation disclosure discusses various algorithmic steps which are to be embodied in executable code in a given implementation, and that such code also resides in memory, and that it effectively configures any general-purpose processor which executes it, thereby transforming it from a general-purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a computational step on behalf of a party of interest, such as aggregating, applying, auditing, changing, collecting, comparing, computing, correlating, creating, curating, damaging, deduping, deleting, detecting, encrypting, enriching, executing, expiring, filtering, generating, getting, harming, logging, looping, managing, matching, modifying, monitoring, moving, operating, performing, protecting, providing, publishing, reading, receiving, recording, scoring, submitting, tagging, updating, writing (and aggregates, aggregated, applies, applied, etc.) with regard to a destination or other subject may involve intervening action, such as the foregoing or such as forwarding, copying, uploading, downloading, encoding, decoding, compressing, decompressing, encrypting, decrypting, authenticating, invoking, and so on by some other party or mechanism, including any action recited in this document, yet still be understood as being performed directly by or on behalf of the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other storage device or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory and computer readable storage devices are not propagating signal or carrier wave computer readable media. Unless expressly stated otherwise in the claim, "computer readable medium" means a computer readable storage medium, such as a computer readable storage device, and therefore is not a propagating signal per se and not mere energy. Input signals are not propagating signals per se and are not mere energy; they are data 118.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

- 100 operating environment, also referred to as computing environment; includes one or more systems 102
- 101 machine in a system 102, e.g., any device having at least a processor 110 and a memory 112 and also having a distinct identifier such as an IP address or a MAC (media access control) address; may be a physical machine or be a virtual machine implemented on physical hardware
- 102 computer system, also referred to as a "computational system" or "computing system", and when in a network may be referred to as a "node"
- 104 users, e.g., user of an enhanced system 202
- 106 peripheral device
- 108 network generally, including, e.g., LANs, WANs, software-defined networks, clouds, and other wired or wireless networks
- 110 processor or set of processors; includes hardware
- 112 computer-readable storage medium, e.g., RAM, hard disks, storage device
- 114 removable configured computer-readable storage medium, e.g., storage device
- 116 instructions executable with processor; may be on removable storage media or in other memory (volatile or nonvolatile or both)
- 118 digital data in a system 102; data structures, values, source code, and other examples are discussed herein
- 120 kernel(s), e.g., operating system(s), BIOS, UEFI, device drivers
- 122 tool in a computing system, e.g., software development tool, security tool, communication tool, etc.; computational and hence non-human
- 124 security protection mechanism; computational
- 126 display screens, also referred to as "displays"
- 128 risk score; digital; also referred to as risk level or as risk
- 130 event in a computing system 102
- 132 event record, e.g., log, audit (noun); digital
- 134 cloud, also referred to as cloud environment or cloud computing environment
- 136 computing hardware not otherwise associated with a reference number 106, 108, 110, 112, 114
- 202 enhanced computing system, i.e., system 102 enhanced with adaptive protection functionality as taught herein
- 204 adaptive, as implemented in a computing system, meaning responsive within at least 72 hours to a change in circumstances
- 206 protection, as implemented in a computing system, meaning having the effect of reducing or removing a risk to data confidentiality, data integrity, data availability, or privacy of data
- 208 adaptive protection functionality, e.g., software or specialized hardware which performs or is configured to perform steps 802-812, or steps 902-910, or steps 902, 1002, and 910, or steps A, C, D, E of FIG. 11, or step 1212, or any software or hardware which performs or is configured to perform a novel method 1200 or a computational adaptive protection activity first disclosed herein
- 210 protected environment, e.g., an environment 100 whose security is enhance by adaptive protection functionality 208
- 302 software implementing at least FIG. 11 steps A (publish risk score where protection mechanism can get it), C (protection mechanism gets risk score), D (protection mechanism other software records protection activities and user interactions with the protection mechanism, where risk scoring model can get them), and E (risk scoring model gets record of protection activities and user interactions with the protection mechanism, as input signals); software 302 need not implement FIG. 11 steps B (user interaction with protection mechanism), F (protection mechanism interaction with tool 122 or kernel 120 features 1102), or G (computational or peripheral control or other results—not necessarily entirely computational—of execution of features 1102)
- 304 operationally connect computational items, e.g., such that one item influences the other item by providing input data to it
- 306 user behavior, as represented digitally as interactions with a system 102; human behavior per se is not claimed as part of any embodiment
- 308 protection activities performed by a protection mechanism, e.g., blocking access, downgrading or disabling an identity, requiring multifactor authentication, performing a remote wipe of a device, logging events, etc.
- 310 machine learning risk scoring model; computational
- 312 risk scoring model, generally; computational
- 314 statistical risk scoring model; computational
- 316 interface, e.g., API, which provides access to a record 132; computational
- 318 cybersecurity tool in an environment 210; also referred to as security"; a status, condition, or characteristic which directly impacts the confidentiality, integrity, availability, or privacy of data in a computing system 102
- 320 interface generally
- 402 data confidentiality protection mechanism; computational
- 404 data integrity protection mechanism; computational
- 406 data retention governance protection mechanism; computational
- 408 device protection mechanism; computational
- 410 network access protection mechanism; computational
- 412 digital identity protection mechanism; computational
- 414 application protection mechanism; computational
- 416 physical facility protection mechanism; computational
- 418 communications protection mechanism; computational
- 420 confidentiality of data
- 422 integrity of data, against corruption or tampering
- 424 retention of data in some system 102
- 426 governance of data, e.g., lifecycle management
- 428 access to a network 108
- 430 digital identity in a system 102
- 432 application program, application software
- 434 physical facility, e.g., building with entry restricted by a badging application 318
- 436 digital communications, e.g., email, text, web posting
- 502 insider risk management tool; computational; assists with insider risk management, e.g., identifying possible sources of security risk within an organization, identifying possible event sequences and other aspects of risk scenarios involving such sources, assessing the potential impact of accidental or intentional damage in such scenarios, and formulating tools and techniques to identify, assess, simulate, reduce, prevent, mitigate, investigate, or document such scenarios

504 data leak prevention tool; computational

506 conditional access management tool; computational

508 insider risk, e.g., a quantified assessment of a chance or likelihood or a probability of some accidental or unauthorized (or both) event or omission by an insider; an insider is an employee, officer, trustee, fiduciary, or other person or entity authorized by an organization to have more or different access than the general public to a resource of the organization

510 data leak, e.g., transmission or other movement of data to an unauthorized location or exposure of data to an unauthorized user, or both

512 conditional access, e.g., access to data or other system 102 resource conditioned on specified criteria to be met by a user or by circumstances such as time, date, data size limits, etc.

514 insight; e.g., digital summary of a risk factor, or detection by a risk detection mechanism; for example, in some embodiments a cumulative exfiltration activity detector insight specifies or includes one or more of: a total cumulative activity, a link to that activity detail, any groups where the user is most anomalous, a score that indicates a user is riskier relative to other users if they are anomalous compared 1208 to multiple peer groups, or whether the exfiltration activity contains priority content, for example

516 object data structure representing a user

518 object store, e.g., collection of objects 516

520 user peer group as represented in a computing system, based, e.g., on user role and an organizational chart, user job title, which users access similar resources, or may include an entire department or an entire organization

522 security policy as represented in a computing system; also refers to policy enforcement protective mechanism 124

602 event 130 generated by a system 102

604 event 130 generated by a protective mechanism 124; a subset of events 602

606 classification, as represented in a system 102, e.g., security classification

608 metadata, i.e., data about data, in a system 102

610 numeric threshold in a system 102

612 human resources (HR), as represented in a system 102

614 HR data 118

616 risky relative to a baseline in a system 102

618 risky behavior; a subset of user behavior 306

620 risky behavior data, as represented in a system 102

622 computational platform

624 computational workload

626 sentiment, e.g., expression of emotion or opinion by a person

628 sentiment analysis; computational analysis of text for correlations with sentiments

630 digital result of a sentiment analysis

632 warning (noun) to a user, or computational activity of presenting a warning to a user

Figure 8:
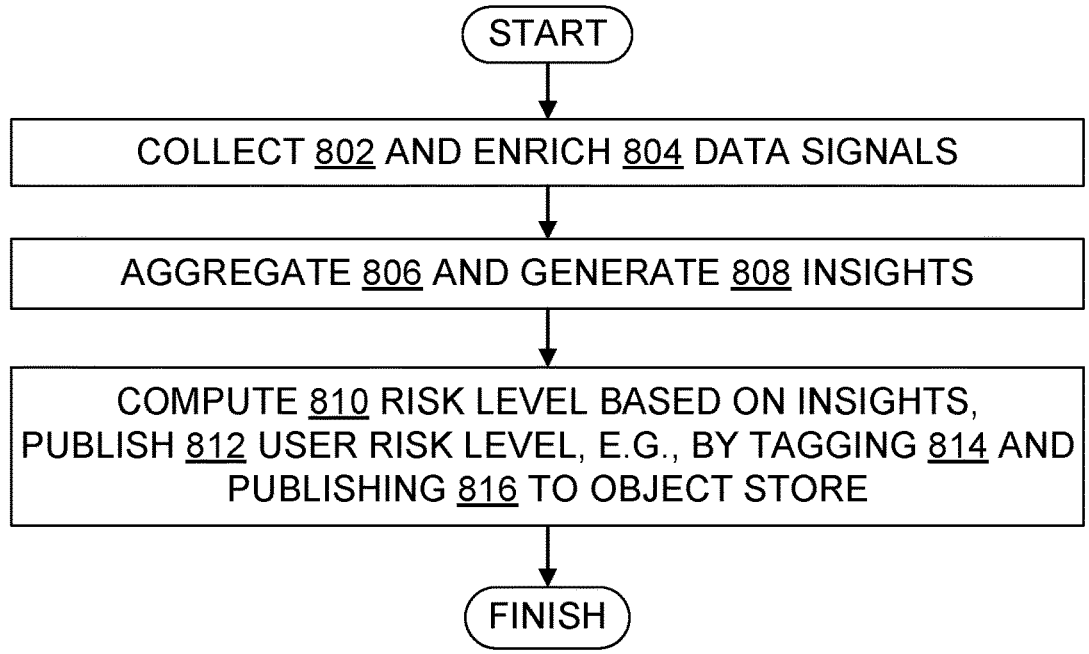
FIG. 8 is a flowchart illustrating steps in some insider risk management processes.

800 flowchart; 800 also refers to insider risk management processes that are illustrated by or consistent with the FIG. 8 flowchart

802 computationally collect data input signals, e.g., via an API

804 computationally enrich data input signals

806 computationally aggregate data input signals

808 computationally generate insights 514 from data input signals

810 computationally compute a risk level 128

812 computationally publish a risk level 128 so protection mechanisms 124 can get it

814 computationally tag an object data structure 516 with a risk level

816 computationally publish an object 516 to a store 518

Figure 9:
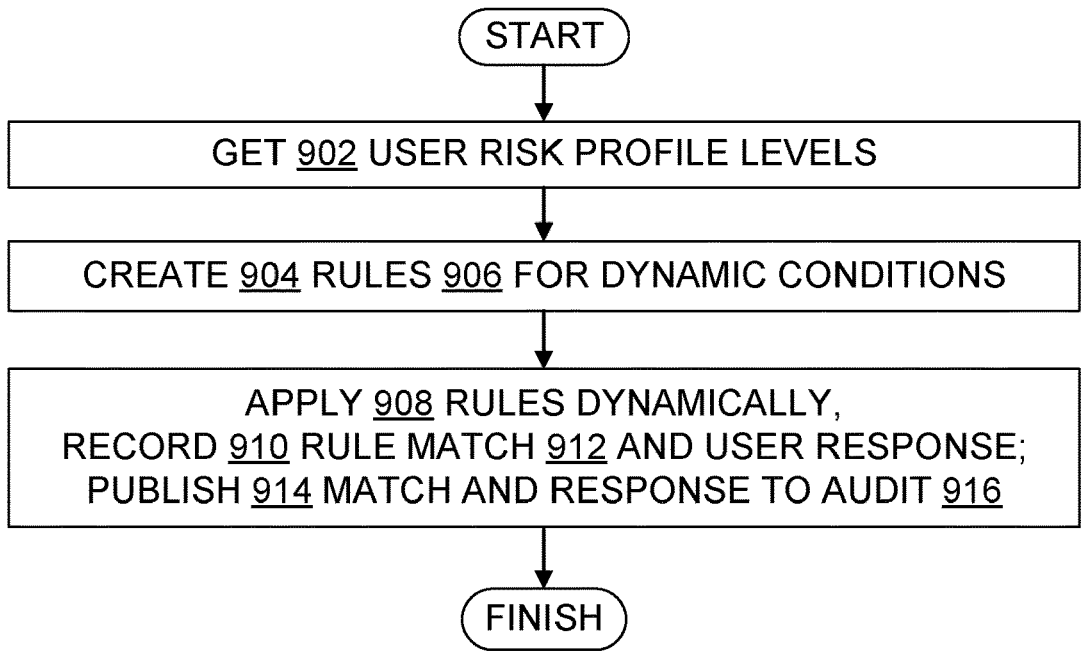
FIG. 9 is a flowchart illustrating steps in some data leak prevention processes.

900 flowchart; 900 also refers to data leak prevention processes that are illustrated by or consistent with the FIG. 9 flowchart

902 computationally get a risk level 128, e.g., via an API

904 computationally create a data leak prevention rule 906, e.g., based on a policy 522 or admin instructions via a user interface 320

906 data leak prevention rule; digital

908 computationally apply a rule 906

910 computationally record a rule match, or a user response to rule enforcement, or both, e.g., in a log 132

912 computationally match circumstances in a system 102 to a rule 906; numeral 912 also applies to the state of a match being found

914 computationally publish data recorded by step 910, so protection mechanisms 124 can get that data, e.g., in an audit log 916

916 digital audit log 916; an example of a record 132; numeral 916 also refers to the computational activity of creating, updating, or assessing an audit log with respect to security

Figure 10:
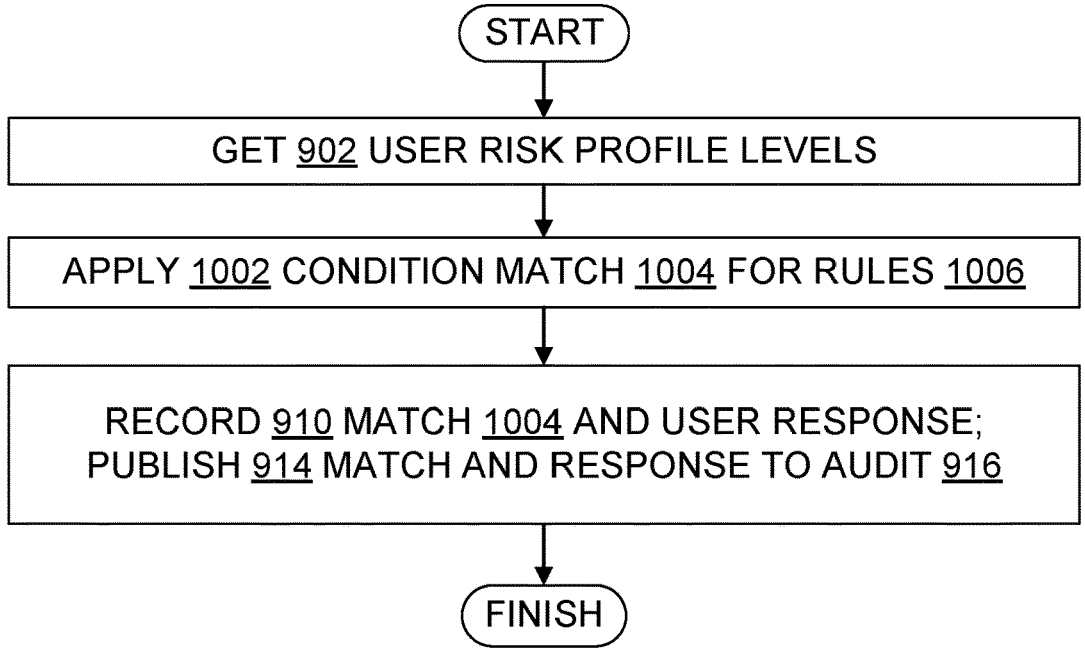
FIG. 10 is a flowchart illustrating steps in some conditional access processes.

1000 flowchart; 1000 also refers to conditional access processes that are illustrated by or consistent with the FIG. 10 flowchart

1002 computationally apply a matching rule 1006

1004 computationally match circumstances in a system 102 to a rule 1006; numeral 1004 also applies to the state of a match being found

1006 conditional access rule; digital

1100 adaptive protection loop, e.g., performance of steps A, C, D, E (ACDE for short), or steps CDEA, or steps DEAC, or steps EACD, by a system 102, or functionality for causing such performance

1102 features of software in a system, e.g., routines whose performance is commanded via a user interface

1104 a result of performance of a feature 1102

1200 flowchart; 1200 also refers to adaptive prevention processes that are illustrated by or consistent with the FIG. 12 flowchart, which incorporates the FIGS. 2, 7-11, and 13 flowcharts and other steps taught herein

1202 computationally monitor user behavior by monitoring computational activity which includes or arises from user interaction with a system 102

1204 computationally perform one or more protection activities 308

1206 computationally operate (execute, perform, run) locally inside an operating system or other kernel, as opposed to running on top of the kernel

1208 computationally compare behaviors, directly or by comparing statistics such as means, medians, etc.

1210 computationally read a record 132; step 802 and FIG. 11 step E are examples of step 1210

1212 computationally provide adaptive protection, e.g., by performing FIG. 11 steps E, A, and C plus step 1204

1214 computationally semantically dedupe events 1216 computationally curate data
1220 computationally filter data
1222 computationally submit data to a model; FIG. 11 step E is an example, and step 1222 is implicit in step 810 because the risk level computation 810 is based on submitted data
1224 computationally correlate events with a particular human even though the events occurred under different digital identities; this effectively also correlates the different digital identities with that particular human
1226 computationally correlate events with a particular human even though the events occurred on different devices; this effectively also correlates the different devices with that particular human
1228 computationally detect a pattern of behavior, e.g., using pattern matching on events 130
1230 pattern of behavior; digital
1232 computationally detect risky behavior
1234 computationally receive a risk score, e.g., via an API; in step 816 and in FIG. 11 step A the object store receives 1234 a risk score, in FIG. 11 step C the protection mechanism receives 1234 a risk score
1236 computationally modify a risk score, e.g., by raising it, lowering it, or expiring it
1238 computationally harm data or access to data
1240 computationally delete data
1242 computationally encrypt data
1244 computationally damage data, e.g., by corrupting it, tampering with it, altering it in random ways
1246 computationally move data in a way that impacts availability of the data, e.g., from local storage to a remote archive, or from online storage to offline storage
1248 computationally change or attempt to change a sensitivity label
1250 sensitivity label or sensitivity type in a computing system
1252 calculate a baseline; computational
1254 baseline; digital
1256 historic data, also referred to as historic patterns or behavior analytics; digital
1258 any step or item discussed in the present disclosure that has not been assigned some other reference numeral; 1258 may thus be shown expressly as a reference numeral for various steps or items or both, and may be added as a reference numeral (in the current disclosure or any subsequent patent application which claims priority to the current disclosure) for various steps or items or both without thereby adding new matter
1300 flowchart; 1300 also refers to risk profile update processes that are illustrated by or consistent with the FIG. 13 flowchart
1302 computationally execute queries to determine current input data and severity 128 level
1304 queries in a system 102 to determine current input data and severity 128 level
1306 severity; an example of risk score 128
1308 change in severity
1310 update severity in profile 1312; an example of modifying 1236
1312 user profile data structure containing current severity level

CONCLUSION

Some embodiments operationally connect 304 a risk score 128 with cybersecurity protection mechanisms 124 and user interactions data 130 in a feedback loop 1100. The risk score 128 guides protection activities 308 by the protection mechanisms 124, thereby prompting or preventing various user interactions 306. The protection activities 308 and the user interactions data 130 are recorded 910 in audit logs 916, and curated 1216 data based on the audit logs is fed 1222 to a risk scoring model 312 as input. The risk scoring model 312 then updates 1236 the risk score 128, and the loop 1100 repeats as the protection mechanisms 124 alter their protection activities 308 based on the updated risk score, thereby providing 1212 adaptive protection 206. Security tools 318 for insider risk management 502, data leak prevention 504, and conditional access 506 are enhanced to provide adaptive protection, e.g., such that they record 910 protection activities and user interactions for use as risk model input, and such that they 318 check 902 regularly for risk score updates and modify their protection activities 308 accordingly.

Embodiments are understood to also themselves include or benefit from tested and appropriate security controls and privacy controls such as the General Data Protection Regulation (GDPR). Use of the tools and techniques taught herein is compatible with use of such controls.

Although Microsoft technology is used in some motivating examples, the teachings herein are not limited to use in technology supplied or administered by Microsoft. Under a suitable license, for example, the present teachings could be embodied in software or services provided by other cloud service providers.

Although particular embodiments are expressly illustrated and described herein as processes, as configured storage media, or as systems, it will be appreciated that discussion of one type of embodiment also generally extends to other embodiment types. For instance, the descriptions of processes in connection with the Figures also help describe configured storage media, and help describe the technical effects and operation of systems and manufactures like those discussed in connection with other Figures. It does not follow that any limitations from one embodiment are necessarily read into another. In particular, processes are not necessarily limited to the data structures and arrangements presented while discussing systems or manufactures such as configured memories.

Those of skill will understand that implementation details may pertain to specific code, such as specific thresholds, comparisons, specific kinds of platforms or programming languages or architectures, specific scripts or other tasks, and specific computing environments, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification. The abstract is provided for convenience and for compliance with patent office requirements; it is not a substitute for the claims and does not govern claim interpretation in the event of any apparent conflict with other parts of the specification. Similarly, the summary is provided for convenience and does not govern in the event of any conflict with the claims or with other parts of the specification. Claim interpretation shall be made in view of the specification as understood by one of skill in the art; innovators are not required to recite every nuance within the claims themselves as though no other disclosure was provided herein.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. An adaptive protection computing system, comprising:
   a digital memory;
   a processor set including at least one processor, the processor set in operable communication with the digital memory;
   a record interface to a protection mechanism record, the protection mechanism record including a user behavior data portion and a protection activity data portion; and
   a risk scoring model which upon execution by the processor set reads the protection mechanism record and modifies a risk score based on the protection mechanism record user behavior data portion and also based on the protection mechanism record protection activity data portion, the risk score associated in the digital memory with at least one of: a user identifier or a user object.

2. The computing system of claim 1, wherein the adaptive protection computing system upon execution performs in a functionality loop in which the risk score influences the protection activity data portion and the user behavior data portion, and the protection activity data portion and the user behavior data portion influence the risk score in turn, and the loop repeats multiple times.

3. The computing system of claim 1, further comprising a protection mechanism which upon execution monitors a user behavior which is associated in the digital memory with the user identifier or the user object or both, and wherein the protection mechanism performs a protection activity according the user behavior and according to the risk score of the user, and wherein the protection mechanism also records data representing the user behavior in the protection mechanism record and records data representing the protection activity in the protection mechanism record.

4. The computing system of claim 1, further comprising at least N of the following protection mechanisms, N being in the range from two to nine: a data confidentiality protection mechanism, a data integrity protection mechanism, a data retention governance protection mechanism, a device protection mechanism, a network access protection mechanism, a digital identity protection mechanism, an application protection mechanism, a physical facility protection mechanism, or a communications protection mechanism.

5. The computing system of claim 1, further comprising at least one of the following security tools which operationally depends on the risk score: an insider risk management tool, a data leak prevention tool, or a conditional access management tool.

6. The computing system of claim 1, further comprising an operating system, and wherein the operating system upon execution by the processor set performs at least one of: collecting on a device local input signals for the risk scoring model, or executing locally on the device the risk scoring model.

7. The computing system of claim 1, wherein the risk scoring model comprises at least one of: a statistical risk scoring model, or a machine learning risk scoring model, and the risk scoring model compares the record of the user behavior to at least one of: a record of a past behavior which is associated in the digital memory with the user identifier or the user object or both, or a record of a behavior of a peer group which is associated in the digital memory with the user identifier or the user object or both.

8. An adaptive protection process performed by a computing system, the process comprising:
monitoring a user behavior and performing a protection activity according to the user behavior and according to a risk score, the risk score associated in a digital memory of the computing system with at least one of: a user identifier or a user object;
recording in at least one record at least a portion of the user behavior and recording in the at least one record at least a portion of the protection activity;
reading the at least one record and modifying the risk score based on the at least one record of the user behavior and based on the at least one record of the protection activity; and
providing adaptive protection by repeating the monitoring, recording, reading, and modifying in a loop, and repeating the loop.

9. The process of claim 8, wherein the modifying includes curating data and submitting curated data to a risk scoring model, and curating data includes at least one of:
semantically deduping data; or
filtering out a system-generated event which was not generated by a protection mechanism.

10. The process of claim 8, wherein the modifying includes submitting data to a risk scoring model, and the submitted data includes at least one of:
human resources data; or
a result of a sentiment analysis of a communication sent, the communication associated in the digital memory with at least one of: the user identifier or the user object.

11. The process of claim 8, wherein the modifying includes correlating multiple digital identities to a single human actor.

12. The process of claim 8, wherein the modifying includes correlating multiple devices to a single human actor.

13. The process of claim 8, wherein the modifying includes detecting at least one of the following behavior patterns:
a user performs a risky behavior, receives a warning, and stops the risky behavior; or
the user performs a risky behavior, receives a warning, and continues the risky behavior or performs another risky behavior, or both.

14. The process of claim 8, wherein the modifying includes detecting at least one of the following risky behaviors:
an attempt to change a sensitivity label of a document;
an attempt to harm data integrity of particular data by deleting the particular data, encrypting the particular data, damaging the particular data, or moving the particular data to a location which has less availability than a current location of the particular data; or
an attempt to harm data integrity of an amount of data which is more than a threshold amount of data by deleting the amount of data, encrypting the amount of data, damaging the amount of data, or moving the amount of data to a location which has less availability than a current location of the amount of data.

15. A computer-readable storage device configured with data and instructions which upon execution by a processor cause a computing system to perform a process to adaptively modify a security protection mechanism activity, the process comprising:
reading, from at least one record, user behavior data representing a user behavior and protection activity data representing the protection activity performed by the protection mechanism, the user behavior and the protection activity according to a first risk score, the first risk score associated in a digital memory of the computing system with at least one of: a user identifier or a user object;
submitting at least a portion of the user behavior data and at least a portion of the protection activity data to a risk scoring model;
receiving from the risk scoring model a second risk score, the second risk score associated in the digital memory of the computing system with at least one of: the user identifier or the user object; and
providing adaptive protection by repeating the reading, submitting, and receiving in a loop, with the second risk score of a given iteration of the loop serving as the first risk score of a next iteration of the loop.

16. The storage device of claim 15, wherein the user behavior data and the protection activity data each span at least two of the following workloads: an endpoint device workload, a platform workload, or an application workload.

17. The storage device of claim 15, wherein the protection activity data of a particular protection tool represents protection activity of at least three of the following protection mechanisms which communicate operationally and bidirectionally with the particular protection tool: a data confidentiality protection mechanism, a data integrity protection mechanism, a data retention governance protection mechanism, a device protection mechanism, a network access protection mechanism, a digital identity protection mechanism, an application protection mechanism, a physical facility protection mechanism, or a communications protection mechanism.

18. The storage device of claim 15, wherein the process further comprises calculating the first risk score based on at least a baseline, the baseline being dependent on at least a historic pattern of an organization.

19. The storage device of claim 15, wherein the process further comprises at least one of the following:
- correlating multiple digital identities to a single human actor; or
- correlating multiple devices to a single human actor.

20. The storage device of claim 15, wherein the process further comprises detecting at least one of the following behavior patterns:
- a user performs a risky behavior, receives a warning, and stops the risky behavior; or
- the user performs a risky behavior, receives a warning, and continues the risky behavior or performs another risky behavior, or both.

* * * * *